United States Patent
Chen et al.

(10) Patent No.: US 9,535,233 B2
(45) Date of Patent: Jan. 3, 2017

(54) OPTICAL IMAGING LENS AND ELECTRONIC DEVICE COMPRISING THE SAME

(71) Applicants: Shih-Han Chen, Taichung (TW); Long Ye, Taichung (TW); Chung-Chih Chang, Taichung (TW)

(72) Inventors: Shih-Han Chen, Taichung (TW); Long Ye, Taichung (TW); Chung-Chih Chang, Taichung (TW)

(73) Assignee: Genius Electronic Optical Co., Ltd., Taichung (TW)

( * ) Notice: Subject to any disclaimer, the term of this patent is extended or adjusted under 35 U.S.C. 154(b) by 15 days.

(21) Appl. No.: 14/598,227

(22) Filed: Jan. 16, 2015

(65) Prior Publication Data

US 2016/0116707 A1    Apr. 28, 2016

(30) Foreign Application Priority Data

Oct. 24, 2014    (CN) .......................... 2014 1 0576813

(51) Int. Cl.
*G02B 13/18* (2006.01)
*G02B 3/02* (2006.01)
*G02B 9/34* (2006.01)
*G02B 13/00* (2006.01)
*H04N 5/225* (2006.01)
*G02B 7/02* (2006.01)
*G02B 27/00* (2006.01)

(52) U.S. Cl.
CPC ............. *G02B 13/004* (2013.01); *G02B 7/021* (2013.01); *G02B 27/0025* (2013.01); *H04N 5/2252* (2013.01); *H04N 5/2254* (2013.01)

(58) Field of Classification Search
CPC ........... G02B 9/34; G02B 13/04; G02B 13/18; G02B 13/00; G02B 13/004; G02B 27/0025; G02B 7/021; H04N 5/2252; H04N 5/2254
USPC .......................... 359/715, 781, 774, 772, 783
See application file for complete search history.

(56) References Cited

U.S. PATENT DOCUMENTS

| | | | |
|---|---|---|---|
| 7,848,032 B1 | 12/2010 | Chen | |
| 8,089,698 B1* | 1/2012 | Tang | ...................... G02B 13/04 |
| | | | 359/644 |
| 8,179,616 B1 | 5/2012 | Hsu | |
| 8,284,502 B2 | 10/2012 | Hsu | |
| 8,416,511 B2 | 4/2013 | Asami | |
| 2004/0190161 A1 | 9/2004 | Yamamoto | |
| 2014/0043699 A1 | 2/2014 | Asami | |
| 2014/0043700 A1 | 2/2014 | Asami | |
| 2014/0049842 A1 | 2/2014 | Asami | |

(Continued)

*Primary Examiner* — Alicia M Harrington
(74) *Attorney, Agent, or Firm* — Winston Hsu; Scott Margo

(57) ABSTRACT

An optical imaging lens includes a first, second, third and fourth lens element, and an aperture stop positioned between the second and third lens elements. The first lens element has an object-side surface with a convex portion in a vicinity of its periphery, the second lens element has an image-side surface with a concave portion in a vicinity of the optical axis, the third lens element has an image-side surface with a convex portion in a vicinity of the optical axis, the fourth lens element is made of plastic and has an object-side surface with a concave portion in a vicinity of the optical axis, and the optical imaging lens set does not include any lens element with refractive power other than said first, second, third and fourth lens elements.

20 Claims, 26 Drawing Sheets

(56) References Cited

U.S. PATENT DOCUMENTS

2014/0055871 A1 2/2014 Asami
2014/0078604 A1 3/2014 Asami
2014/0092485 A1 4/2014 Kawamura
2014/0111869 A1 4/2014 Kawamura

* cited by examiner

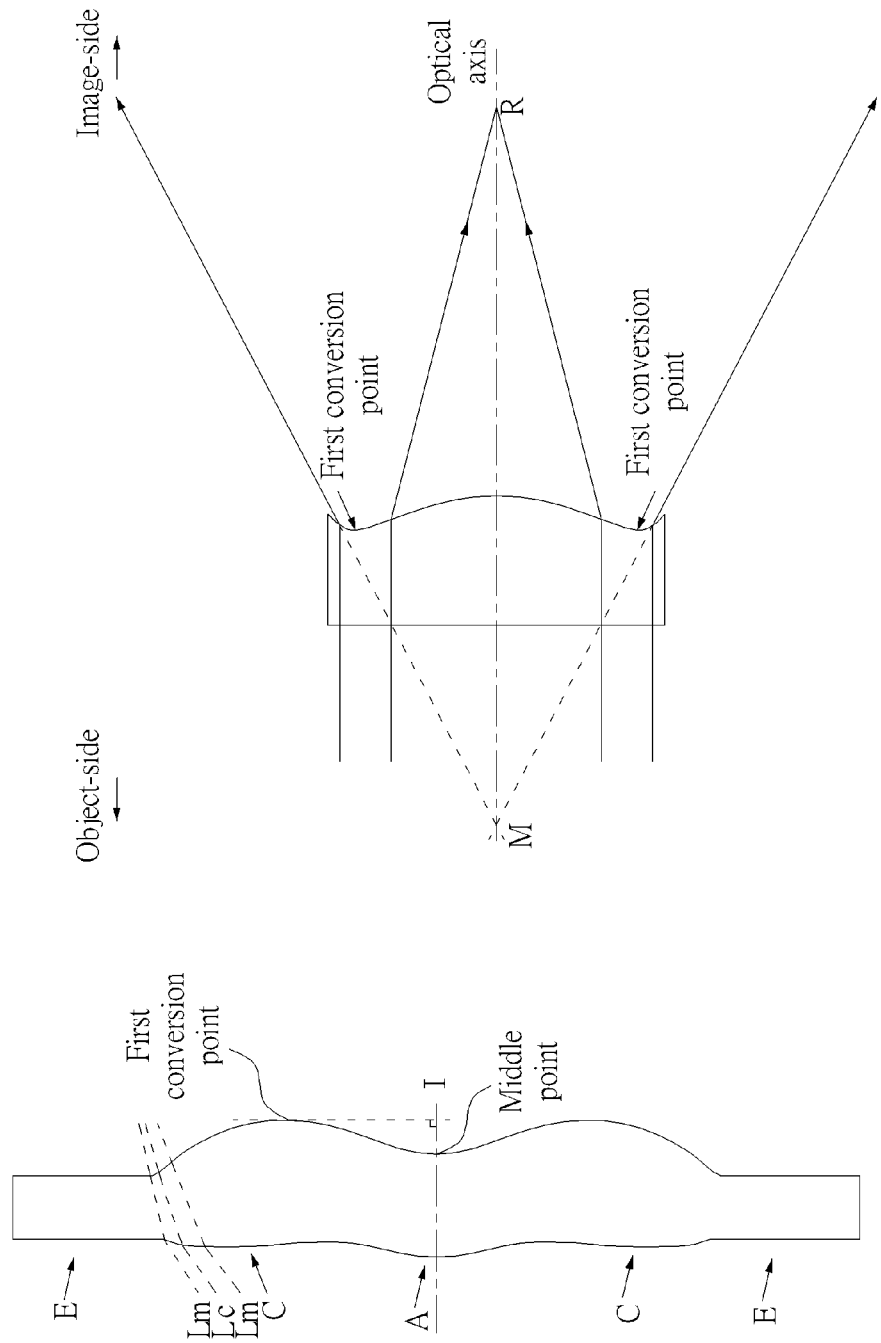

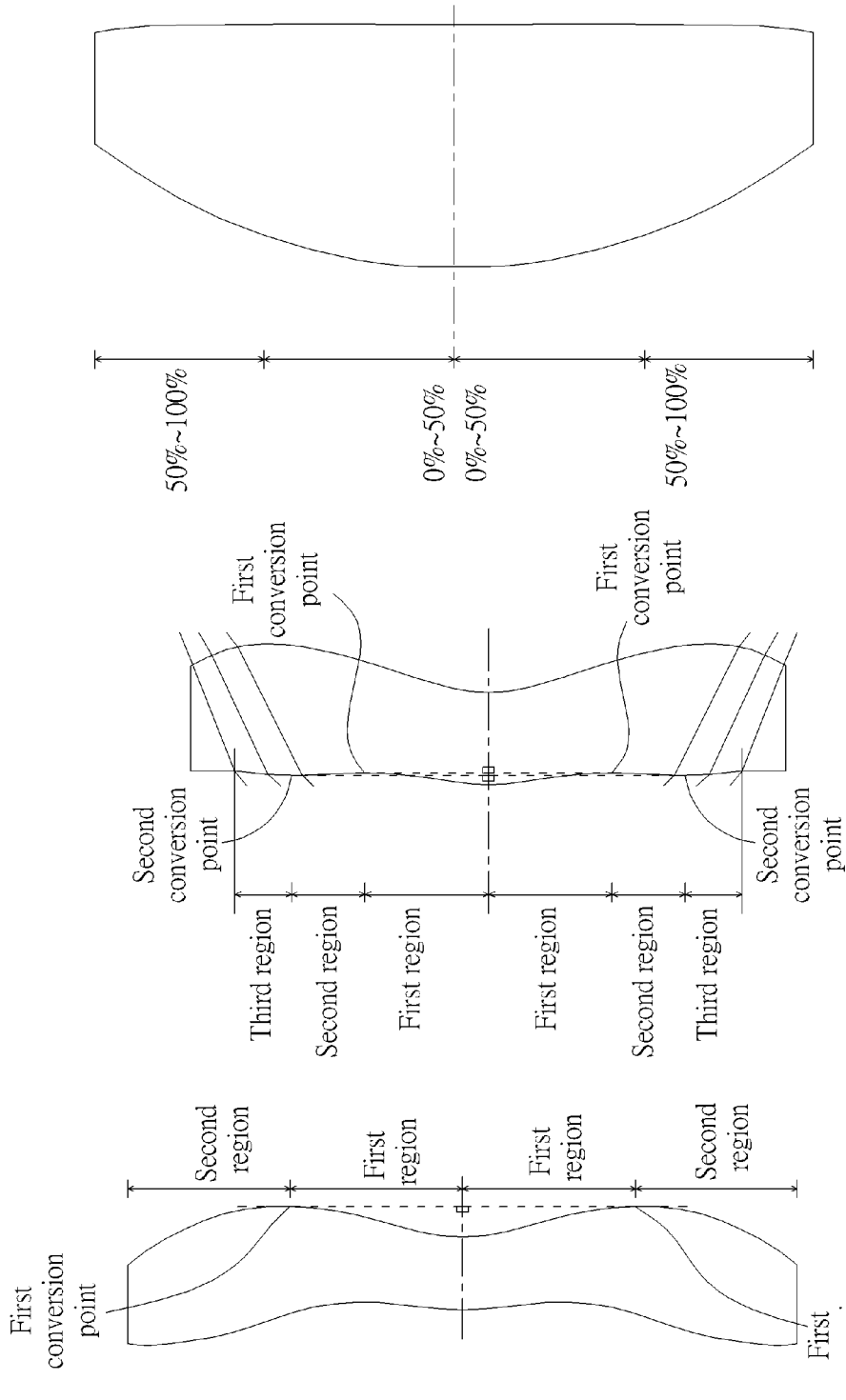

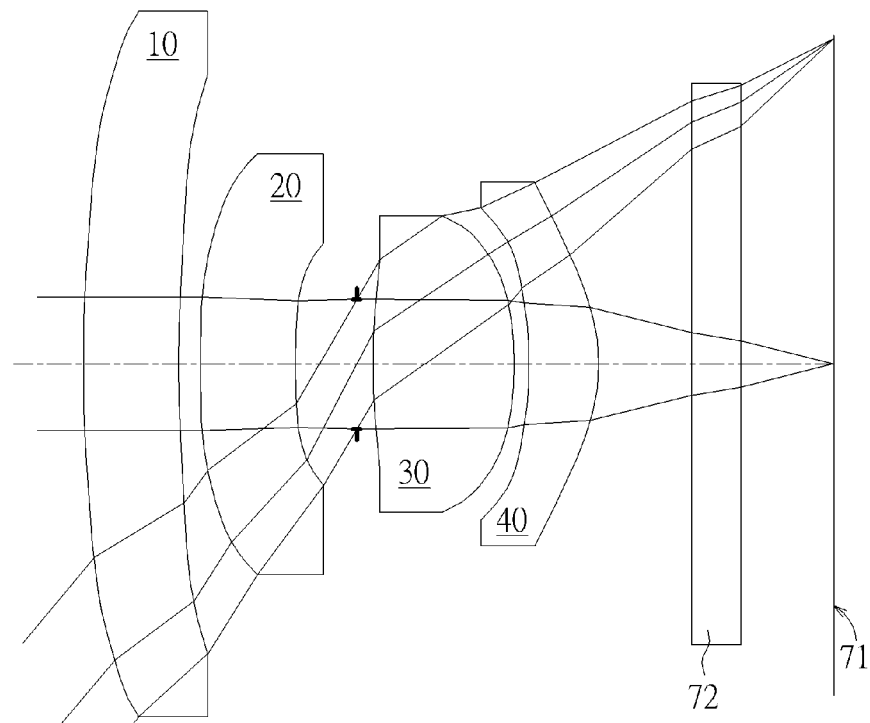
FIG. 16
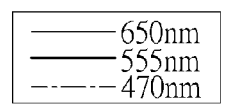
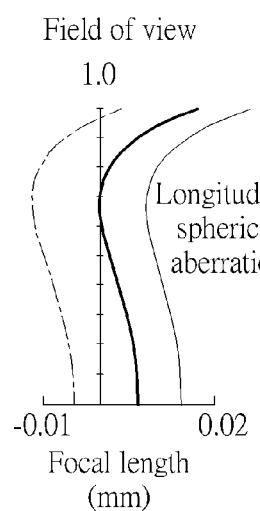
FIG. 17A
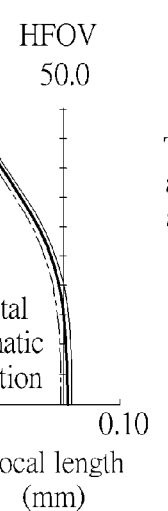
FIG. 17B
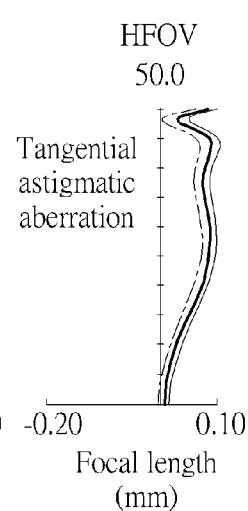
FIG. 17C
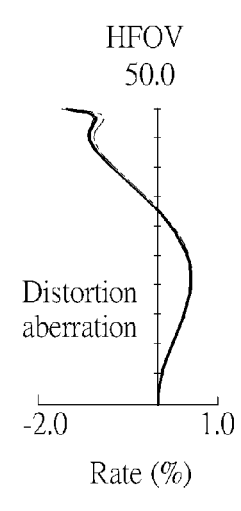
FIG. 17D

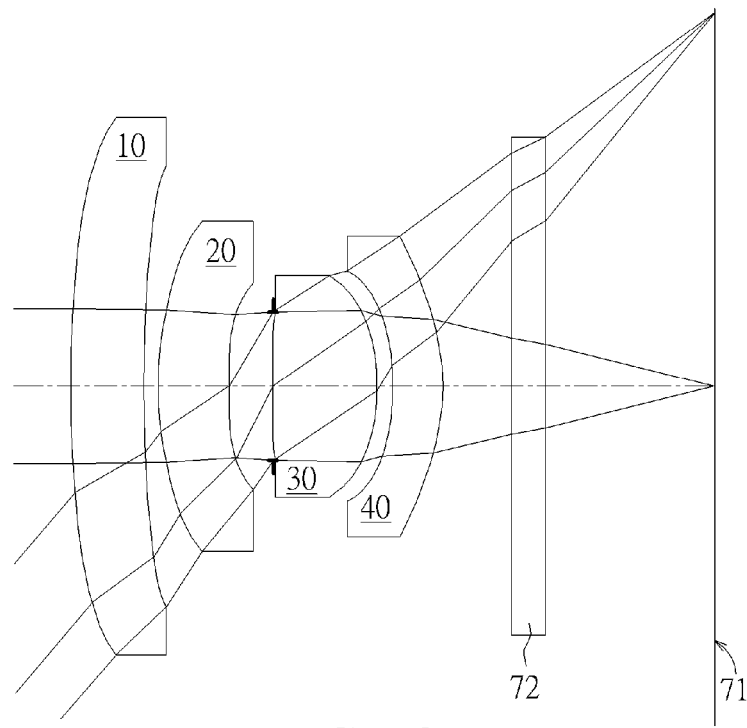
FIG. 18
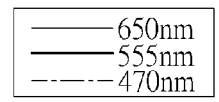
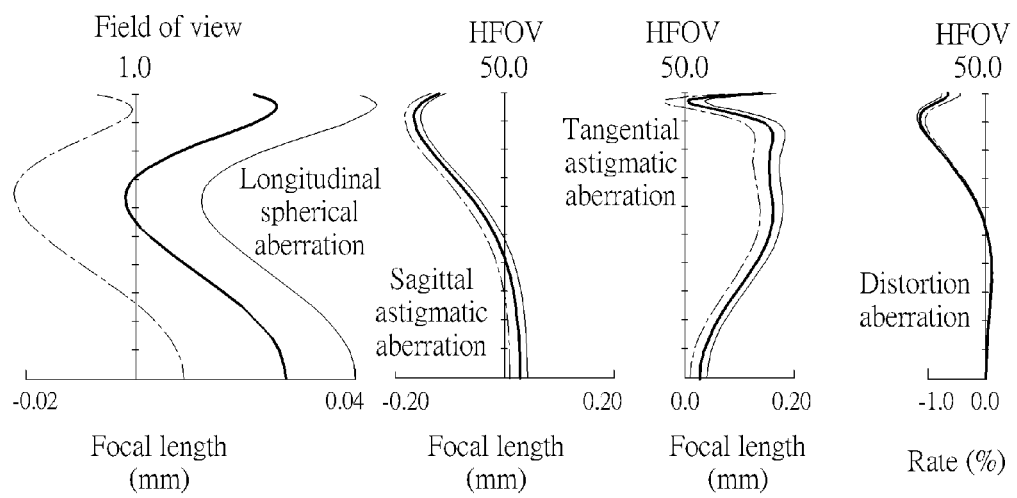
FIG. 19A  FIG. 19B  FIG. 19C  FIG. 19D

| First Example | | | | | | |
|---|---|---|---|---|---|---|
| F= 2.049 mm., HFOV(Half Field Of View)= 50.0 deg., Fno= 2.0 | | | | | | |
| No. | | Curvature Radius | Ape. Stop Distance Lens Thickness Air Gap | Refractive Index | Abbe No. | Focal Length | Material |
| | Object | infinity | 0.100 | | | | |
| 11 | First Lens | 9.839 | 1.200 | 1.643 | 22.437 | -9.204 | plastic |
| 12 | | 3.535 | 0.087 | | | | |
| 21 | Second Lens | 194.605 | 0.200 | 1.535 | 55.712 | -5.227 | plastic |
| 22 | | 2.765 | 0.532 | | | | |
| 80 | Ape. Stop | infinity | 0.024 | | | | |
| 31 | Third Lens | 6.787 | 1.114 | 1.535 | 55.712 | 2.439 | plastic |
| 32 | | -1.529 | 0.100 | | | | |
| 41 | Fourth Lens | -1.660 | 0.701 | 1.531 | 55.744 | 4.272 | plastic |
| 42 | | -1.101 | 0.400 | | | | |
| 71 | Filter | infinity | 0.210 | 1.517 | 64.167 | | |
| 72 | Filter -Image Plane | infinity | 2.225 | | | | |
| | Image Plane | infinity | | | | | |

FIG.22

| No. | K | a4 | a6 | a8 | a10 | a12 |
|---|---|---|---|---|---|---|
| First object-side surface 11 | 8.415E-01 | 2.205E-02 | -4.042E-04 | -3.172E-04 | -6.298E-05 | 2.001E-05 |
| First image-side surface 12 | -3.140E+01 | 8.771E-03 | 9.150E-04 | 4.102E-04 | 3.061E-04 | 1.210E-03 |
| Second object-side surface 21 | 0.000E+00 | 9.021E-02 | 4.815E-02 | -2.103E-02 | -2.392E-02 | 1.817E-02 |
| Second image-side surface 22 | 1.287E+01 | 3.684E-01 | -1.122E-01 | 1.547E+00 | -3.426E+00 | 4.493E+00 |
| Third object-side surface 31 | 6.349E+00 | -9.800E-02 | 5.030E-01 | 1.663E-01 | -3.192E+00 | 3.869E+00 |
| Third image-side surface 32 | -2.561E-01 | -8.323E-02 | 3.548E-01 | -3.773E-01 | 4.083E-02 | 6.926E-02 |
| Fourth object-side surface 41 | 4.560E-01 | -9.419E-03 | 4.380E-02 | 1.022E-01 | -1.894E-01 | 8.629E-02 |
| Fourth image-side surface 42 | -1.089E+00 | -5.532E-03 | -3.578E-02 | 8.458E-03 | 1.117E-02 | -9.366E-04 |

FIG.23

| Second Example | | | | | | |
|---|---|---|---|---|---|---|
| F= 0.828 mm., HFOV(Half Field Of View)= 50.0 deg., Fno= 2.0 | | | | | | |
| No. | | Curvature Radius | Ape. Stop Distance Lens Thickness Air Gap | Refractive Index | Abbe No. | Focal Length | Material |
| | Object | infinity | 0.1 | | | | |
| 11 | First Lens | 1.848 | 0.281 | 1.643 | 22.437 | -8.059 | plastic |
| 12 | | 1.283 | 0.666 | | | | |
| 21 | Second Lens | -2.969 | 0.281 | 1.535 | 55.712 | -2.033 | plastic |
| 22 | | 1.783 | 0.804 | | | | |
| 80 | Ape. Stop | infinity | 0.000 | | | | |
| 31 | Third Lens | 1.580 | 0.372 | 1.535 | 55.712 | 1.344 | plastic |
| 32 | | -1.218 | 0.779 | | | | |
| 41 | Fourth Lens | -1.137 | 0.653 | 1.531 | 55.744 | 1.316 | plastic |
| 42 | | -0.520 | 0.400 | | | | |
| 71 | Filter | infinity | 0.210 | 1.517 | 64.167 | | |
| 72 | Filter -Image Plane | infinity | 0.319 | | | | |
| | Image Plane | infinity | | | | | |

FIG.24

| No. | K | a4 | a6 | a8 | a10 | a12 |
|---|---|---|---|---|---|---|
| First object-side surface 11 | 0.000E+00 | -2.303E-03 | -1.122E-02 | -5.456E-04 | 9.386E-04 | -2.487E-04 |
| First image-side surface 12 | -3.009E-02 | 1.976E-01 | -2.718E-01 | 2.673E-03 | 2.645E-03 | 7.787E-03 |
| Second object-side surface 21 | 0.000E+00 | 1.068E-01 | -1.476E-03 | -3.059E-02 | -6.487E-02 | 6.368E-02 |
| Second image-side surface 22 | -8.910E+01 | 5.227E-01 | 6.504E-01 | 1.362E+00 | -3.076E+00 | 1.483E+01 |
| Third object-side surface 31 | 0.000E+00 | 3.513E-01 | -8.472E-02 | 1.297E+01 | -4.675E+01 | 1.639E+02 |
| Third image-side surface 32 | -2.187E+00 | 1.557E-01 | 2.879E+00 | 2.740E+00 | -6.808E+01 | 3.203E+02 |
| Fourth object-side surface 41 | 1.044E+00 | -8.436E-01 | 1.594E+00 | 1.827E+00 | 1.606E+00 | -4.306E+00 |
| Fourth image-side surface 42 | -1.228E+00 | -1.666E-01 | -4.089E-01 | 3.641E-01 | 7.305E-01 | 7.661E-01 |

FIG.25

| Third Example | | | | | | | |
|---|---|---|---|---|---|---|---|
| F= 0.896 mm., HFOV(Half Field Of View)= 50.0 deg., Fno= 2.0 | | | | | | | |
| No. | | Curvature Radius | Ape. Stop Distance Lens Thickness Air Gap | Refractive Index | Abbe No. | Focal Length | Material |
| | Object | infinity | 0.1 | | | | |
| 11 | First Lens | 124.268 | 0.703 | 1.535 | 55.712 | 1029.524 | plastic |
| 12 | | 159.999 | 0.101 | | | | |
| 21 | Second Lens | 3.333 | 0.455 | 1.643 | 22.437 | -4.618 | plastic |
| 22 | | 1.492 | 0.274 | | | | |
| 80 | Ape. Stop | infinity | 0.080 | | | | |
| 31 | Third Lens | -2.226 | 0.195 | 1.535 | 55.712 | 1.793 | plastic |
| 32 | | -0.693 | 0.098 | | | | |
| 41 | Fourth Lens | -2.108 | 1.180 | 1.531 | 55.744 | 0.998 | plastic |
| 42 | | -0.507 | 0.400 | | | | |
| 71 | Filter | infinity | 0.210 | 1.517 | 64.167 | | |
| 72 | Filter -Image Plane | infinity | 0.291 | | | | |
| | Image Plane | infinity | | | | | |

FIG.26

| No. | K | a4 | a6 | a8 | a10 | a12 |
|---|---|---|---|---|---|---|
| First object-side surface 11 | 0.000E+00 | 3.257E-03 | -2.410E-04 | 1.436E-03 | -1.825E-04 | 3.470E-05 |
| First image-side surface 12 | 1.756E+04 | -5.815E-03 | 5.677E-03 | 1.100E-02 | 5.838E-04 | 1.763E-03 |
| Second object-side surface 21 | 8.108E+00 | 1.130E-01 | 4.003E-03 | 4.079E-02 | -1.172E-02 | 3.050E-01 |
| Second image-side surface 22 | 9.114E+00 | 1.517E-01 | 5.160E-02 | 6.509E-01 | 3.419E+01 | -1.178E+00 |
| Third object-side surface 31 | 0.000E+00 | 2.660E-01 | 1.534E+00 | -8.734E+01 | 1.119E+03 | -4.767E+03 |
| Third image-side surface 32 | -1.356E+00 | 1.732E-01 | 4.528E+00 | 3.940E+00 | -5.641E+01 | -1.270E+01 |
| Fourth object-side surface 41 | -1.074E+00 | 7.768E-02 | 7.798E-01 | -8.472E-01 | 4.962E-01 | -2.768E+00 |
| Fourth image-side surface 42 | -1.038E+00 | 1.558E-02 | -1.302E-01 | -8.646E-02 | -1.202E-01 | 1.572E-01 |

FIG.27

| Fourth Example | | | | | | |
|---|---|---|---|---|---|---|
| F= 2.021 mm., HFOV(Half Field Of View)= 50.0 deg., Fno= 2.0 | | | | | | |
| No. | | Curvature Radius | Ape. Stop Distance Lens Thickness Air Gap | Refractive Index | Abbe No. | Focal Length | Material |
| | Object | infinity | 0.1 | | | | |
| 11 | First Lens | 25.962 | 0.880 | 1.535 | 55.712 | 2551.438 | plastic |
| 12 | | 26.150 | 0.101 | | | | |
| 21 | Second Lens | 2.104 | 0.338 | 1.643 | 22.437 | 19.954 | plastic |
| 22 | | 2.354 | 0.158 | | | | |
| 80 | Ape. Stop | infinity | 0.034 | | | | |
| 31 | Third Lens | -5.768 | 0.366 | 1.535 | 55.712 | 2.744 | plastic |
| 32 | | -1.199 | 0.228 | | | | |
| 41 | Fourth Lens | -1.117 | 0.960 | 1.531 | 55.744 | 3.223 | plastic |
| 42 | | -0.879 | 0.400 | | | | |
| 71 | Filter | infinity | 0.210 | 1.517 | 64.167 | | |
| 72 | Filter -Image Plane | infinity | 1.195 | | | | |
| | Image Plane | infinity | | | | | |

FIG.28

| No. | K | a4 | a6 | a8 | a10 | a12 |
|---|---|---|---|---|---|---|
| First object-side surface 11 | 0.000E+00 | 1.441E-02 | 5.494E-06 | 3.528E-04 | -9.290E-06 | 4.000E-05 |
| First image-side surface 12 | 3.276E+02 | 7.569E-03 | 7.518E-03 | 4.226E-03 | 2.537E-03 | 1.454E-03 |
| Second object-side surface 21 | -4.355E+00 | -1.755E-02 | -6.937E-02 | -6.939E-03 | -6.264E-03 | 2.631E-02 |
| Second image-side surface 22 | 1.519E+01 | -1.395E-01 | -5.991E-01 | 9.920E-01 | -1.822E+00 | -8.327E+00 |
| Third object-side surface 31 | 0.000E+00 | -1.449E-01 | -3.509E-04 | -6.170E-01 | 2.828E+00 | -3.501E+00 |
| Third image-side surface 32 | 2.875E-01 | -9.961E-02 | 2.200E-01 | -1.448E-01 | -4.787E-01 | 2.137E+00 |
| Fourth object-side surface 41 | 3.034E-01 | -1.011E-01 | -2.355E-02 | 2.958E-01 | 3.037E-01 | 9.779E-03 |
| Fourth image-side surface 42 | -8.975E-01 | -1.330E-02 | -6.094E-02 | -7.546E-03 | -1.864E-03 | 7.323E-03 |

FIG.29

| Fifth Example | | | | | | |
|---|---|---|---|---|---|---|
| F= 1.314 mm., HFOV(Half Field Of View)= 50.0 deg., Fno= 2.0 | | | | | | |
| No. | | Curvature Radius | Ape. Stop Distance Lens Thickness Air Gap | Refractive Index | Abbe No. | Focal Length | Material |
| | Object | infinity | 0.1 | | | | |
| 11 | First Lens | 8.467 | 0.434 | 1.535 | 55.712 | 21.199 | plastic |
| 12 | | 32.486 | 0.030 | | | | |
| 21 | Second Lens | 2.831 | 0.546 | 1.643 | 22.437 | -93.735 | plastic |
| 22 | | 2.500 | 0.190 | | | | |
| 80 | Ape. Stop | infinity | 0.017 | | | | |
| 31 | Third Lens | -20.962 | 0.434 | 1.535 | 55.712 | 2.320 | plastic |
| 32 | | -1.184 | 0.175 | | | | |
| 41 | Fourth Lens | -1.458 | 0.548 | 1.531 | 55.744 | 1.710 | plastic |
| 42 | | -0.634 | 0.400 | | | | |
| 71 | Filter | infinity | 0.210 | 1.517 | 64.167 | | |
| 72 | Filter -Image Plane | infinity | 0.443 | | | | |
| | Image Plane | infinity | | | | | |

FIG.30

| No. | K | a4 | a6 | a8 | a10 | a12 |
|---|---|---|---|---|---|---|
| First object-side surface 11 | 0.000E+00 | 6.969E-03 | -4.383E-04 | 9.173E-05 | -1.886E-05 | 8.200E-08 |
| First image-side surface 12 | 9.298E+01 | -2.888E-03 | 2.779E-03 | 1.471E-03 | 3.053E-04 | -3.605E-04 |
| Second object-side surface 21 | 5.538E-01 | 1.894E-02 | -6.572E-03 | 3.456E-02 | 2.183E-02 | -4.206E-03 |
| Second image-side surface 22 | 1.860E+01 | 7.728E-02 | 1.013E-01 | 4.977E-01 | -2.616E+00 | -5.963E+00 |
| Third object-side surface 31 | 0.000E+00 | -8.103E-02 | -5.534E-01 | -1.145E+01 | -2.700E+01 | 6.067E+02 |
| Third image-side surface 32 | -4.931E-01 | -2.596E-02 | 1.434E-01 | -8.134E-01 | -1.109E+00 | 1.726E+00 |
| Fourth object-side surface 41 | 4.017E-01 | -7.030E-02 | -3.616E-02 | 1.181E-01 | 6.180E-02 | -9.162E-02 |
| Fourth image-side surface 42 | -8.318E-01 | 1.814E-02 | -1.214E-01 | -4.568E-03 | -6.175E-02 | -1.806E-02 |

FIG.31

| Sixth Example ||||||||
|---|---|---|---|---|---|---|---|
| F= 1.182 mm., HFOV(Half Field Of View)= 50.0 deg., Fno= 2.0 ||||||||
| No. | | Curvature Radius | Ape. Stop Distance Lens Thickness Air Gap | Refractive Index | Abbe No. | Focal Length | Material |
| | Object | infinity | 0.1 | | | | |
| 11 | First Lens | 10.016 | 0.407 | 1.643 | 22.437 | -78.319 | plastic |
| 12 | | 8.231 | 0.087 | | | | |
| 21 | Second Lens | 3.184 | 0.407 | 1.535 | 55.712 | -294.563 | plastic |
| 22 | | 2.982 | 0.263 | | | | |
| 80 | Ape. Stop | infinity | 0.072 | | | | |
| 31 | Third Lens | 2.774 | 0.600 | 1.535 | 55.712 | 1.847 | plastic |
| 32 | | -1.426 | 0.061 | | | | |
| 41 | Fourth Lens | -2.529 | 0.298 | 1.531 | 55.744 | 2.082 | plastic |
| 42 | | -0.803 | 0.400 | | | | |
| 71 | Filter | infinity | 0.210 | 1.517 | 64.167 | | |
| 72 | Filter -Image Plane | infinity | 0.395 | | | | |
| | Image Plane | infinity | | | | | |

FIG.32

| No. | K | a4 | a6 | a8 | a10 | a12 |
|---|---|---|---|---|---|---|
| First object-side surface 11 | 1.288E+01 | 1.160E-02 | 2.187E-03 | 3.227E-04 | 3.193E-05 | 6.202E-05 |
| First image-side surface 12 | -4.120E+01 | -3.000E-03 | 4.602E-03 | 3.807E-03 | 2.131E-03 | -7.787E-04 |
| Second object-side surface 21 | 2.868E+00 | 6.339E-02 | 5.228E-02 | 9.119E-02 | 3.692E-02 | -5.770E-02 |
| Second image-side surface 22 | 2.053E+01 | 2.364E-01 | 1.551E+00 | 5.108E+00 | 7.752E+00 | -5.335E+01 |
| Third object-side surface 31 | -4.996E+01 | 1.305E-01 | -7.996E-03 | -5.973E+00 | -1.196E+01 | 6.851E+01 |
| Third image-side surface 32 | 3.624E+00 | -3.803E-01 | -5.779E-02 | -4.715E-01 | -9.824E-02 | -1.191E+00 |
| Fourth object-side surface 41 | 9.182E+00 | -2.766E-01 | -2.435E-01 | -3.089E-01 | -1.815E-01 | 4.398E-01 |
| Fourth image-side surface 42 | -2.458E+00 | 5.140E-02 | -2.312E-03 | -6.251E-03 | 2.181E-02 | 1.251E-01 |

FIG.33

| Seventh Example | | | | | | |
|---|---|---|---|---|---|---|
| F= 1.916 mm., HFOV(Half Field Of View)= 50.0 deg., Fno= 2.0 | | | | | | |
| No. | | Curvature Radius | Ape. Stop Distance Lens Thickness Air Gap | Refractive Index | Abbe No. | Focal Length | Material |
| | Object | infinity | 0.1 | | | | |
| 11 | First Lens | 9.660 | 0.429 | 1.643 | 22.437 | -55.845 | plastic |
| 12 | | 7.491 | 0.090 | | | | |
| 21 | Second Lens | 2.549 | 0.413 | 1.535 | 55.712 | 15.960 | plastic |
| 22 | | 3.422 | 0.265 | | | | |
| 80 | Ape. Stop | infinity | -0.003 | | | | |
| 31 | Third Lens | 8.776 | 0.614 | 1.535 | 55.712 | 2.431 | plastic |
| 32 | | -1.495 | 0.093 | | | | |
| 41 | Fourth Lens | -1.789 | 0.300 | 1.531 | 55.744 | 5.952 | plastic |
| 42 | | -1.210 | 0.400 | | | | |
| 71 | Filter | infinity | 0.210 | 1.517 | 64.167 | | |
| 72 | Filter -Image Plane | infinity | 0.998 | | | | |
| | Image Plane | infinity | | | | | |

FIG.34

| No. | K | a4 | a6 | a8 | a10 | a12 |
|---|---|---|---|---|---|---|
| First object-side surface 11 | 0.000E+00 | 9.907E-03 | 1.850E-03 | 5.198E-04 | 5.553E-05 | 2.601E-05 |
| First image-side surface 12 | -4.172E+01 | -4.984E-03 | 2.317E-03 | 2.875E-03 | 1.807E-03 | -3.717E-04 |
| Second object-side surface 21 | -7.903E-01 | 2.853E-02 | -3.983E-03 | 4.904E-02 | 2.679E-02 | -3.229E-02 |
| Second image-side surface 22 | 2.632E+01 | 1.788E-01 | 8.386E-01 | 5.784E-01 | -2.201E+00 | -7.444E-02 |
| Third object-side surface 31 | 0.000E+00 | 1.119E-01 | 2.837E-01 | -2.025E+00 | -5.763E+00 | 2.113E+01 |
| Third image-side surface 32 | 3.792E+00 | -3.233E-01 | -1.355E-01 | -2.604E-01 | 1.050E+00 | 1.965E+00 |
| Fourth object-side surface 41 | 5.463E+00 | -2.280E-01 | 4.442E-02 | 1.370E-02 | -1.396E-01 | -4.952E-01 |
| Fourth image-side surface 42 | -3.173E+00 | 4.628E-02 | -9.059E-03 | -1.460E-02 | -2.582E-02 | 7.726E-03 |

FIG.35

| | Range lower limit | Range upper limit | Example 1 | Example 2 | Example 3 | Example 4 | Example 5 | Example 6 | Example 7 |
|---|---|---|---|---|---|---|---|---|---|
| T1 | | | 1.200 | 0.281 | 0.703 | 0.880 | 0.434 | 0.407 | 0.429 |
| G12 | | | 0.087 | 0.666 | 0.101 | 0.101 | 0.030 | 0.087 | 0.090 |
| T2 | | | 0.200 | 0.281 | 0.455 | 0.338 | 0.546 | 0.407 | 0.413 |
| G23 | | | 0.556 | 0.804 | 0.354 | 0.192 | 0.207 | 0.335 | 0.262 |
| T3 | | | 1.114 | 0.372 | 0.195 | 0.366 | 0.434 | 0.600 | 0.614 |
| G34 | | | 0.100 | 0.779 | 0.098 | 0.228 | 0.175 | 0.061 | 0.093 |
| T4 | | | 0.701 | 0.653 | 1.180 | 0.960 | 0.548 | 0.298 | 0.300 |
| G4F | | | 0.400 | 0.400 | 0.400 | 0.400 | 0.400 | 0.400 | 0.400 |
| TF | | | 0.210 | 0.210 | 0.210 | 0.210 | 0.210 | 0.210 | 0.210 |
| GFP | | | 2.225 | 0.319 | 0.291 | 1.195 | 0.443 | 0.395 | 0.998 |
| EFL | | | 2.049 | 0.828 | 0.896 | 2.021 | 1.314 | 1.182 | 1.916 |
| AAG | | | 0.743 | 2.249 | 0.553 | 0.521 | 0.412 | 0.483 | 0.445 |
| ALT | | | 3.215 | 1.587 | 2.533 | 2.544 | 1.962 | 1.712 | 1.756 |
| BFL | | | 2.835 | 0.929 | 0.901 | 1.805 | 1.053 | 1.005 | 1.608 |
| TTL | | | 6.793 | 4.765 | 3.987 | 4.870 | 3.427 | 3.200 | 3.809 |
| T1/T2 | 0.3 | 6.1 | 6.000 | 1.000 | 1.545 | 2.604 | 0.795 | 1.000 | 1.039 |
| ALT/T3 | 2 | 13 | 2.886 | 4.266 | 12.990 | 6.951 | 4.521 | 2.853 | 2.860 |
| EFL/T2 | 1.5 | 45 | 10.245 | 2.947 | 1.969 | 5.979 | 2.407 | 2.904 | 4.639 |
| ALT/G34 | 1.7 | 38 | 32.150 | 2.037 | 25.847 | 11.158 | 11.211 | 28.066 | 18.882 |
| T1/T3 | 0.3 | 10 | 1.077 | 0.755 | 3.605 | 2.404 | 1.000 | 0.678 | 0.699 |
| AAG/T3 | 0.3 | 12 | 0.667 | 6.046 | 2.836 | 1.423 | 0.949 | 0.805 | 0.725 |
| T1/T4 | 0.1 | 20 | 1.712 | 0.430 | 0.596 | 0.917 | 0.792 | 1.366 | 1.430 |
| AAG/T1 | 0.1 | 15 | 0.619 | 8.004 | 0.787 | 0.592 | 0.949 | 1.187 | 1.037 |
| G34/T4 | 0.01 | 22 | 0.143 | 1.193 | 0.083 | 0.238 | 0.319 | 0.205 | 0.310 |
| ALT/T4 | 1.6 | 27 | 4.586 | 2.430 | 2.147 | 2.650 | 3.580 | 5.745 | 5.853 |
| ALT/G23 | 1 | 15 | 5.782 | 1.974 | 7.155 | 13.250 | 9.478 | 5.110 | 6.702 |
| EFL/T3 | 1 | 70 | 1.839 | 2.226 | 4.595 | 5.522 | 3.028 | 1.970 | 3.121 |
| EFL/T4 | 0.3 | 150 | 2.923 | 1.268 | 0.759 | 2.105 | 2.398 | 3.966 | 6.387 |
| AAG/T4 | 0.1 | 15 | 1.060 | 3.444 | 0.469 | 0.543 | 0.752 | 1.621 | 1.483 |
| T3/T4 | 0.01 | 1.7 | 1.589 | 0.570 | 0.165 | 0.381 | 0.792 | 2.013 | 2.047 |
| AAG/T2 | 0.3 | 8.1 | 3.715 | 8.004 | 1.215 | 1.541 | 0.755 | 1.187 | 1.077 |
| G34/T3 | 0.01 | 10 | 0.090 | 2.094 | 0.503 | 0.623 | 0.403 | 0.102 | 0.151 |
| EFL/G23 | 1 | 13 | 3.685 | 1.030 | 2.531 | 10.526 | 6.348 | 3.528 | 7.313 |

FIG.36

OPTICAL IMAGING LENS AND ELECTRONIC DEVICE COMPRISING THE SAME

CROSS REFERENCE TO RELATED APPLICATION

This application claims priority from P.R.C. Patent Application No. 201410576813.5, filed on Oct. 24, 2014, the contents of which are hereby incorporated by reference in their entirety for all purposes.

BACKGROUND OF THE INVENTION

1. Field of the Invention

The present invention generally relates to an optical imaging lens set and an electronic device which includes such optical imaging lens set. Specifically speaking, the present invention is directed to an optical imaging lens set of four lens elements and an electronic device which includes such optical imaging lens set of four lens elements.

2. Description of the Prior Art

In recent years, the popularity of mobile phones and digital cameras makes photography modules (including optical imaging lens set, holder and sensor, etc) well developed. Mobile phones and digital cameras become lighter and thinner, so that the miniaturization demands of photography modules get higher and higher. As the charge coupled device (CCD) or complementary metal-oxide semiconductor (CMOS) technologies advance, the size of the photography modules can be shrunk too, but these photography modules still need to maintain good imaging quality.

Conventional optical imaging lens sets mostly have only four lens elements, and since they have fewer lens elements, the total length of the optical imaging lens set is relatively short. However, as the requirements of good imaging quality increase, the conventional optical imaging lens set of four lens elements can hardly satisfy these requirements. U.S. Pat. Nos. 7,848,032, 828,450 and 8,179,616 disclose an optical imaging lens set of four lens elements respectively, and all of the total length (the distance between the first object surface of the first lens element to an image plane) of the optical imaging lens sets are over 8 mm. In fact, the total length of the optical imaging lens set disclosed in U.S. Pat. No. 8,179,616 is over 11 mm. The size of the optical imaging lens set is too big to satisfy the specification requirements of consumer electronics products.

SUMMARY OF THE INVENTION

In light of the above, the present invention proposes an optical imaging lens set that is lightweight, has a low production cost, has an enlarged half of field of view, has a high resolution and has high image quality. The optical imaging lens set of four lens elements of the present invention has a first lens element, a second lens element, an aperture stop, a third lens element and a fourth lens element sequentially from an object side to an image side along an optical axis.

The present invention provides an optical imaging lens set, from an object side toward an image side in order along an optical axis comprising: a first lens element, a second lens element, an aperture stop, a third lens element and a fourth lens element. The first lens element has an object-side surface with a convex portion in a vicinity of its periphery, the second lens element has an image-side surface with a concave portion in a vicinity of the optical axis, the third lens element having an image-side surface with a convex portion in a vicinity of the optical axis, and the fourth lens element has an object-side surface with a concave portion in a vicinity of the optical axis. The optical imaging lens set does not include any lens element with refractive power other than said first, second, third and fourth lens elements.

In the optical imaging lens set of four lens elements of the present invention, an air gap G12 along the optical axis is disposed between the first lens element and the second lens element, an air gap G23 along the optical axis is disposed between the second lens element and the third lens element, an air gap G34 along the optical axis is disposed between the third lens element and the fourth lens element, and the sum of total three air gaps between adjacent lens elements from the first lens element to the fourth lens element along the optical axis is AAG, AAG=G12+G23+G34.

In the optical imaging lens set of four lens elements of the present invention, the first lens element has a first lens element thickness T1 along the optical axis, the second lens element has a second lens element thickness T2 along the optical axis, the third lens element has a third lens element thickness T3 along the optical axis, the fourth lens element has a fourth lens element thickness T4 along the optical axis, and the total thickness of all the lens elements in the optical imaging lens set along the optical axis is ALT, ALT=T1+T2+T3+T4.

In addition, the distance between the image-side surface of the fourth lens element to an image plane along the optical axis is BFL (back focal length); the effective focal length of the optical imaging lens set is EFL.

In the optical imaging lens set of four lens elements of the present invention, the relationship $T1/T2 \leq 6.1$ is satisfied.

In the optical imaging lens set of four lens elements of the present invention, the relationship $ALT/T3 \leq 13$ is satisfied.

In the optical imaging lens set of four lens elements of the present invention, the relationship $EFL/T2 \leq 45$ is satisfied.

In the optical imaging lens set of four lens elements of the present invention, the relationship $1.7 \leq ALT/G34$ is satisfied.

In the optical imaging lens set of four lens elements of the present invention, the relationship $T1/T3 \leq 10$ is satisfied.

In the optical imaging lens set of four lens elements of the present invention, the relationship $AAG/T3 \leq 12$ is satisfied.

In the optical imaging lens set of four lens elements of the present invention, the relationship $T1/T4 \leq 20$ is satisfied.

In the optical imaging lens set of four lens elements of the present invention, the relationship $AAG/T1 \leq 15$ is satisfied.

In the optical imaging lens set of four lens elements of the present invention, the relationship $G34/T4 \leq 22$ is satisfied.

In the optical imaging lens set of four lens elements of the present invention, the relationship $ALT/T4 \leq 27$ is satisfied.

In the optical imaging lens set of four lens elements of the present invention, the relationship $1 \leq ALT/G23$ is satisfied.

In the optical imaging lens set of four lens elements of the present invention, the relationship $EFL/T3 \leq 70$ is satisfied.

In the optical imaging lens set of four lens elements of the present invention, the relationship $EFL/T4 \leq 150$ is satisfied.

In the optical imaging lens set of four lens elements of the present invention, the relationship $AAG/T4 \leq 15$ is satisfied.

In the optical imaging lens set of four lens elements of the present invention, the relationship $T3/T4 \leq 1.7$ is satisfied.

In the optical imaging lens set of four lens elements of the present invention, the relationship $AAG/T2 \leq 8.1$ is satisfied.

In the optical imaging lens set of four lens elements of the present invention, the relationship $G34/T3 \leq 10$ is satisfied.

In the optical imaging lens set of four lens elements of the present invention, the relationship $1 \leq EFL/G23$ is satisfied.

The present invention also proposes an electronic device which includes the optical imaging lens set as described above. The electronic device includes a case and an image module disposed in the case. The image module includes an optical imaging lens set as described above, a barrel for the installation of the optical imaging lens set, a module housing unit for the installation of the barrel, a substrate for the installation of the module housing unit, and an image sensor disposed on the substrate and at an image side of the optical imaging lens set.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIGS. 1-5 illustrates the methods for determining the surface shapes and for determining one region being a region in a vicinity of the optical axis or the region in a vicinity of its circular periphery of one lens element.

FIG. 16 illustrates a sixth example of the optical imaging lens set of four lens elements of the present invention.

FIG. 17A illustrates the longitudinal spherical aberration on the image plane of the sixth example.

FIG. 17B illustrates the astigmatic aberration on the sagittal direction of the sixth example.

FIG. 17C illustrates the astigmatic aberration on the tangential direction of the sixth example.

FIG. 17D illustrates the distortion aberration of the sixth example.

FIG. 18 illustrates a seventh example of the optical imaging lens set of four lens elements of the present invention.

FIG. 19A illustrates the longitudinal spherical aberration on the image plane of the seventh example.

FIG. 19B illustrates the astigmatic aberration on the sagittal direction of the seventh example.

FIG. 19C illustrates the astigmatic aberration on the tangential direction of the seventh example.

FIG. 19D illustrates the distortion aberration of the seventh example.

FIG. 22 shows the optical data of the first example of the optical imaging lens set.

FIG. 23 shows the aspheric surface data of the first example.

FIG. 24 shows the optical data of the second example of the optical imaging lens set.

FIG. 25 shows the aspheric surface data of the second example.

FIG. 26 shows the optical data of the third example of the optical imaging lens set.

FIG. 27 shows the aspheric surface data of the third example.

FIG. 28 shows the optical data of the fourth example of the optical imaging lens set.

FIG. 29 shows the aspheric surface data of the fourth example.

FIG. 30 shows the optical data of the fifth example of the optical imaging lens set.

FIG. 31 shows the aspheric surface data of the fifth example.

FIG. 32 shows the optical data of the sixth example of the optical imaging lens set.

FIG. 33 shows the aspheric surface data of the sixth example.

FIG. 34 shows the optical data of the seventh example of the optical imaging lens set.

FIG. 35 shows the aspheric surface data of the seventh example.

FIG. 36 shows some important ratios in the examples.

DETAILED DESCRIPTION

Figure 6:
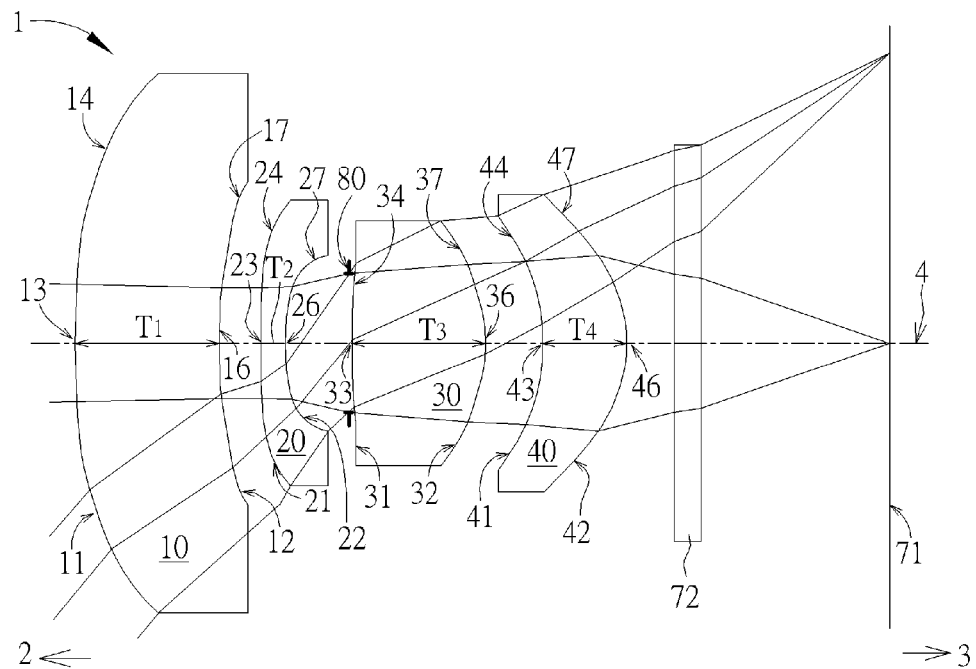
FIG. 6 illustrates a first example of the optical imaging lens set of the present invention.

1. FIG. 1 is a radial cross-sectional view of a lens element. Before determining boundaries of those aforesaid portions, two referential points should be defined first, middle point and conversion point. The middle point of a surface of a lens element is a point of intersection of that surface and the optical axis. The conversion point is a point on a surface of a lens element, where the tangent line of that point is perpendicular to the optical axis. Additionally, if multiple conversion points appear on one single surface, then these conversion points are sequentially named along the radial direction of the surface with numbers starting from the first conversion point. For instance, the first conversion point (closest one to the optical axis), the second conversion point, and the Nth conversion point (farthest one to the optical axis within the scope of the clear aperture of the surface). The portion of a surface of the lens element between the middle point and the first conversion point is defined as the portion in a vicinity of the optical axis. The portion located radially outside of the Nth conversion point (but still within the scope of the clear aperture) is defined as the portion in a vicinity of a periphery of the lens element. In some embodiments, there are other portions existing between the portion in a vicinity of the optical axis and the portion in a vicinity of a periphery of the lens element; the numbers of portions depend on the numbers of the conversion point(s). In addition, the radius of the clear aperture (or a so-called effective radius) of a surface is defined as the radial distance from the optical axis I to a point of intersection of the marginal ray Lm and the surface of the lens element.

2. Referring to FIG. 2, determining the shape of a portion is convex or concave depends on whether a collimated ray passing through that portion converges or diverges. That is, while applying a collimated ray to a portion to be determined in terms of shape, the collimated ray passing through that portion will be bended and the ray itself or its extension line will eventually meet the optical axis. The shape of that portion can be determined by whether the ray or its extension line meets (intersects) the optical axis (focal point) at the object-side or image-side. For instance, if the ray itself intersects the optical axis at the image side of the lens element after passing through a portion, i.e. the focal point of this ray is at the image side (see point R in FIG. 2), the portion will be determined as having a convex shape. On the contrary, if the ray diverges after passing through a portion, the extension line of the ray intersects the optical axis at the object side of the lens element, i.e. the focal point of the ray is at the object side (see point M in FIG. 2), that portion will be determined as having a concave shape. Therefore, referring to FIG. 2, the portion between the middle point and the first conversion point has a convex shape, the portion located radially outside of the first conversion point has a concave shape, and the first conversion point is the point where the portion having a convex shape changes to the portion having a concave shape, namely the border of two adjacent portions. Alternatively, there is another common way for a person with ordinary skill in the art to tell whether a portion in a vicinity of the optical axis has a convex or concave shape by referring to the sign of an "R" value, which is the (paraxial) radius of curvature of a lens surface. The R value which is commonly used in conventional optical design software such as Zemax and CodeV. The R value usually appears in the lens data sheet in the software. For an object-side surface, positive R means that the object-side surface is convex, and negative R means that the object-side surface is concave. Conversely, for an image-side surface, positive R means that the image-side surface is concave, and negative R means that the image-side surface is convex. The result found by using this method should be consistent as by using the other way mentioned above, which determines surface shapes by referring to whether the focal point of a collimated ray is at the object side or the image side.

3. For none conversion point cases, the portion in a vicinity of the optical axis is defined as the portion between 0~50% of the effective radius (radius of the clear aperture) of the surface, whereas the portion in a vicinity of a periphery of the lens element is defined as the portion between 50~100% of effective radius (radius of the clear aperture) of the surface.

Referring to the first example depicted in FIG. 3, only one conversion point, namely a first conversion point, appears within the clear aperture of the image-side surface of the lens element. Portion I is a portion in a vicinity of the optical axis, and portion II is a portion in a vicinity of a periphery of the lens element. The portion in a vicinity of the optical axis is determined as having a concave surface due to the R value at the image-side surface of the lens element is positive. The shape of the portion in a vicinity of a periphery of the lens element is different from that of the radially inner adjacent portion, i.e. the shape of the portion in a vicinity of a periphery of the lens element is different from the shape of the portion in a vicinity of the optical axis; the portion in a vicinity of a periphery of the lens element has a convex shape.

Referring to the second example depicted in FIG. 4, a first conversion point and a second conversion point exist on the object-side surface (within the clear aperture) of a lens element. In which portion I is the portion in a vicinity of the optical axis, and portion III is the portion in a vicinity of a periphery of the lens element. The portion in a vicinity of the optical axis has a convex shape because the R value at the object-side surface of the lens element is positive. The portion in a vicinity of a periphery of the lens element (portion III) has a convex shape. What is more, there is another portion having a concave shape existing between the first and second conversion point (portion II).

Referring to a third example depicted in FIG. 5, no conversion point exists on the object-side surface of the lens element. In this case, the portion between 0~50% of the effective radius (radius of the clear aperture) is determined as the portion in a vicinity of the optical axis, and the portion between 50~100% of the effective radius is determined as the portion in a vicinity of a periphery of the lens element. The portion in a vicinity of the optical axis of the object-side surface of the lens element is determined as having a convex shape due to its positive R value, and the portion in a vicinity of a periphery of the lens element is determined as having a convex shape as well.

As shown in FIG. 6, the optical imaging lens set 1 of four lens elements of the present invention, sequentially located from an object side 2 (where an object is located) to an image side 3 along an optical axis 4, have a first lens element 10, a second lens element 20, a third lens element 30, a fourth lens element 40, a filter 72 and an image plane 71. Generally speaking, the first lens element 10, the second lens element 20, the third lens element 30, and the fourth lens element 40 may be made of a transparent plastic material and each has an appropriate refractive power, but the present invention is not limited to this. There are exclusively four lens elements with refractive power in the optical imaging lens set 1 of the present invention. The optical axis 4 is the optical axis of the entire optical imaging lens set 1, and the optical axis of each of the lens elements coincides with the optical axis of the optical imaging lens set 1.

Furthermore, the optical imaging lens set 1 includes an aperture stop (ape. stop) 80 disposed in an appropriate position. In FIG. 6, the aperture stop 80 is disposed between the second lens element 20 and the third lens element 30.

When light emitted or reflected by an object (not shown) which is located at the object side 2 enters the optical imaging lens set 1 of the present invention, it forms a clear and sharp image on the image plane 71 at the image side 3 after passing through the first lens element 10, the second lens element 20, the aperture stop 80, the third lens element 30, the fourth lens element 40 and the filter 72.

In the embodiments of the present invention, the optional filter 72 may be a filter of various suitable functions, for example, the filter 72 may be an infrared cut filter (IR cut filter), placed between the fourth lens element 40 and the image plane 71. The filter 72 is made of glass.

Each lens element in the optical imaging lens set 1 of the present invention has an object-side surface facing toward the object side 2 as well as an image-side surface facing toward the image side 3. For example, the first lens element 10 has a first object-side surface 11 and a first image-side surface 12; the second lens element 20 has a second object-side surface 21 and a second image-side surface 22; the third lens element 30 has a third object-side surface 31 and a third image-side surface 32; the fourth lens element 40 has a fourth object-side surface 41 and a fourth image-side surface 42. In addition, each object-side surface and image-side surface in the optical imaging lens set 1 of the present invention has a part (or portion) in a vicinity of its circular periphery (circular periphery part) away from the optical axis 4 as well as a part in a vicinity of the optical axis (optical axis part) close to the optical axis 4.

Each lens element in the optical imaging lens set 1 of the present invention further has a central thickness on the optical axis 4. For example, the first lens element 10 has a first lens element thickness T1, the second lens element 20 has a second lens element thickness T2, the third lens element 30 has a third lens element thickness T3, the fourth lens element 40 has a fourth lens element thickness T4. Therefore, the total thickness of all the lens elements in the optical imaging lens set 1 along the optical axis 4 is ALT, ALT=T1+T2+T3+T4.

In addition, between two adjacent lens elements in the optical imaging lens set 1 of the present invention there is an air gap along the optical axis 4. For example, an air gap G12 is disposed between the first lens element 10 and the second lens element 20, an air gap G23 is disposed between the second lens element 20 and the third lens element 30, an air gap G34 is disposed between the third lens element 30 and the fourth lens element 40. Therefore, the sum of total three air gaps between adjacent lens elements from the first lens element 10 to the fourth lens element 40 along the optical axis 4 is AAG, AAG=G12+G23+G34.

In addition, the distance between the first object-side surface 11 of the first lens element 10 to the image plane 71, namely the total length of the optical imaging lens set along the optical axis 4 is TTL; the effective focal length of the optical imaging lens set is EFL; the distance between the fourth image-side surface 42 of the four lens element 40 to the image plane 71 along the optical axis 4 is BFL; the distance between the fourth image-side surface 42 of the four lens element 40 to the filter 72 along the optical axis 4 is G4F; the thickness of the filter 72 along the optical axis 4 is TF; the distance between the filter 72 to the image plane 71 along the optical axis 4 is GFP; Therefore, BFL=G4F+TF+GFP.

Furthermore, the focal length of the first lens element 10 is f1; the focal length of the second lens element 20 is f2; the focal length of the third lens element 30 is f3; the focal length of the fourth lens element 40 is f4; the refractive index of the first lens element 10 is n1; the refractive index of the second lens element 20 is n2; the refractive index of the third lens element 30 is n3; the refractive index of the fourth lens element 40 is n4; the Abbe number of the first lens element 10 is ν1; the Abbe number of the second lens element 20 is ν2; the Abbe number of the third lens element 30 is ν3; and the Abbe number of the fourth lens element 40 is ν4.

First Example

Figures 7A, 7B, 7C, 7D:
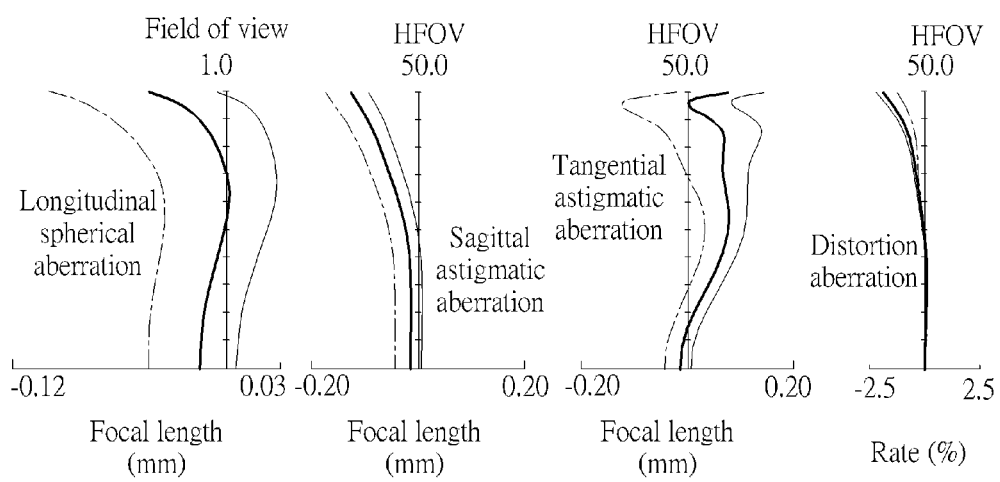
FIG. 7A illustrates the longitudinal spherical aberration on the image plane of the first example.
FIG. 7B illustrates the astigmatic aberration on the sagittal direction of the first example.
FIG. 7C illustrates the astigmatic aberration on the tangential direction of the first example.
FIG. 7D illustrates the distortion aberration of the first example.

Please refer to FIG. 6 which illustrates the first example of the optical imaging lens set 1 of the present invention. Please refer to FIG. 7A for the longitudinal spherical aberration on the image plane 71 of the first example; please refer to FIG. 7B for the astigmatic field aberration on the sagittal direction; please refer to FIG. 7C for the astigmatic field aberration on the tangential direction, and please refer to FIG. 7D for the distortion aberration. The Y axis of the spherical aberration in each example is "field of view" for 1.0. The Y axis of the astigmatic field and the distortion in each example stand for "Half Field of View (HFOV)", HFOV stands for the half field of view which is half of the field of view of the entire optical lens element system. The HFOV is 50 degrees.

The optical imaging lens set 1 of the first example has four lens elements 10 to 40 made of a plastic material and having refractive power. The optical imaging lens set 1 also has an aperture stop 80, a filter 72, and an image plane 71. The aperture stop 80 is provided between the second lens element 20 and the third lens element 30. The filter 72 may be used for preventing specific wavelength light (such as the infrared light) reaching the image plane to adversely affect the imaging quality.

The first lens element 10 has negative refractive power. The first object-side surface 11 facing toward the object side 2 is a convex surface, having a convex part 13 in the vicinity of the optical axis and a convex part 14 in a vicinity of its circular periphery. The first image-side surface 12 facing toward the image side 3 is a concave surface, having a concave part 16 in the vicinity of the optical axis and a concave part 17 in a vicinity of its circular periphery. Besides, both the first object-side surface 11 and the first image-side 12 of the first lens element 10 are aspherical surfaces.

The second lens element 20 has negative refractive power. The second object-side surface 21 facing toward the object side 2 has a convex part 23 in the vicinity of the optical axis and a convex part 24 in a vicinity of its circular periphery. The second image-side surface 22 facing toward the image side 3 is a concave surface, having a concave part 26 in the vicinity of the optical axis and a concave part 27 in a vicinity of its circular periphery. Both the second object-side surface 21 and the second image-side 22 of the second lens element 20 are aspherical surfaces.

The third lens element 30 has positive refractive power. The third object-side surface 31 facing toward the object side 2 has a convex part 33 in the vicinity of the optical axis and a convex part 34 in a vicinity of its circular periphery. The third image-side surface 32 facing toward the image side 3 is a convex surface, having a convex part 36 in the vicinity of the optical axis and a convex part 37 in a vicinity of its circular periphery. Both the third object-side surface 31 and the third image-side 32 of the third lens element 30 are aspherical surfaces.

The fourth lens element 40 has positive refractive power. The fourth object-side surface 41 facing toward the object side 2 is a concave surface, having a concave part 43 in the vicinity of the optical axis and a concave part 44 in a vicinity of its circular periphery; The fourth image-side surface 42 facing toward the image side 3 is a convex surface, having a convex part 46 in the vicinity of the optical axis and a convex part 47 in a vicinity of its circular periphery. Both the fourth object-side surface 41 and the fourth image-side 42 of the fourth lens element 40 are aspherical surfaces. The filter 72 may be disposed between the fourth lens element 40 and the image plane 71.

In the optical imaging lens element 1 of the present invention, the object-side surfaces 11/21/31/41 and image-side surfaces 12/22/32/42 are all aspherical. These aspheric coefficients are defined according to the following formula:

$$Z(Y) = \frac{Y^2}{R} \bigg/ \left(1 + \sqrt{1-(1+K)\frac{Y^2}{R^2}}\right) + \sum_{i=1}^{n} a_{2i} \times Y^{2i}$$

In which:

R represents the curvature radius of the lens element surface;

Z represents the depth of an aspherical surface (the perpendicular distance between the point of the aspherical surface at a distance Y from the optical axis and the tangent plane of the vertex on the optical axis of the aspherical surface);

Y represents a vertical distance from a point on the aspherical surface to the optical axis;

K is a conic constant; and $a_{2i}$ is the aspheric coefficient of the 2i order.

The optical data of the first example of the optical imaging lens set 1 are shown in FIG. 22 while the aspheric surface data are shown in FIG. 23. In the present examples of the optical imaging lens set, the f-number of the entire optical lens element system is Fno, HFOV stands for the half field of view which is half of the field of view of the entire optical lens element system, and the unit for the curvature radius, the thickness and the focal length is in millimeters (mm). The length of the optical imaging lens set (the distance from the first object-side surface 11 of the first lens element 10 to the image plane 71) is 6.793 mm. HFOV is 50 degrees. Some important ratios of the first example are as follows:

T1/T2=6.000
ALT/T3=2.886
EFL/T2=10.245
ALT/G34=32.150
T1/T3=1.077
AAG/T3=0.667
T1/T4=1.712
AAG/T1=0.619
G34/T4=0.143
ALT/T4=4.586
ALT/G23=5.782
EFL/T3=1.839
EFL/T4=2.923
AAG/T4=1.060
T3/T4=1.589
AAG/T2=3.715
G34/T3=0.090
EFL/G23=3.685

Second Example

Figure 8:
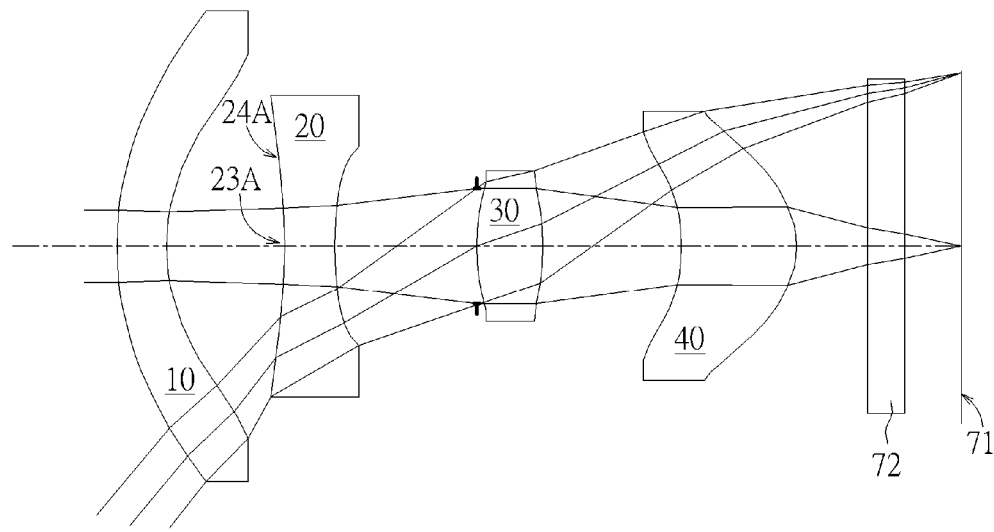
FIG. 8 illustrates a second example of the optical imaging lens set of four lens elements of the present invention.
Figures 9A, 9B, 9C, 9D:
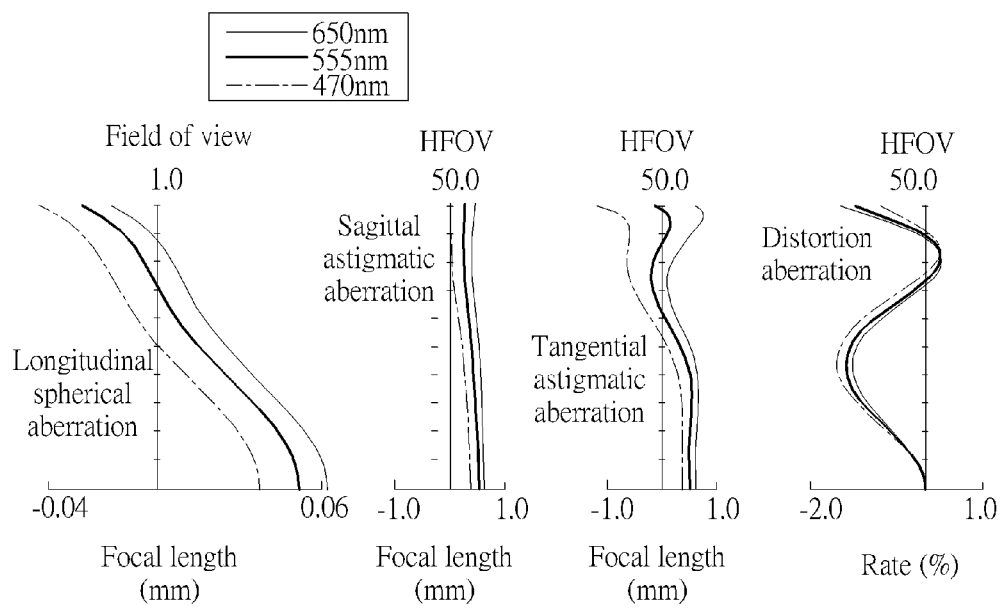
FIG. 9A illustrates the longitudinal spherical aberration on the image plane of the second example.
FIG. 9B illustrates the astigmatic aberration on the sagittal direction of the second example.
FIG. 9C illustrates the astigmatic aberration on the tangential direction of the second example.
FIG. 9D illustrates the distortion aberration of the second example.

Please refer to FIG. 8 which illustrates the second example of the optical imaging lens set 1 of the present invention. It is noted that from the second example to the following examples, in order to simplify the figures, only the components different from what the first example has and the basic lens elements will be labeled in figures. Other components that are the same as what the first example has, such as the object-side surface, the image-side surface, the part in a vicinity of the optical axis and the part in a vicinity of its circular periphery will be omitted in the following example. Please refer to FIG. 9A for the longitudinal spherical aberration on the image plane 71 of the second example; please refer to FIG. 9B for the astigmatic aberration on the sagittal direction; please refer to FIG. 9C for the astigmatic aberration on the tangential direction, and please refer to FIG. 9D for the distortion aberration. The components in the second example are similar to those in the first example, but the optical data such as the curvature radius, the refractive power, the lens thickness, the lens focal length, the aspheric surface or the back focal length in this example are different from the optical data in the first example, and in this example, the second object-side surface 21 of the second lens element 20 has a concave part 23A in the vicinity of the optical axis and a concave part 24A in a vicinity of its circular periphery. The optical data of the second example of the optical imaging lens set are shown in FIG. 24 while the aspheric surface data are shown in FIG. 25. The length of the optical imaging lens set is 4.765 mm. HFOV is 50 degrees. Some important ratios of the second example are as follows:

T1/T2=1.000
ALT/T3=4.266
EFL/T2=2.947
ALT/G34=2.037
T1/T3=0.755
AAG/T3=6.046
T1/T4=0.430
AAG/T1=8.004
G34/T4=1.193
ALT/T4=2.430
ALT/G23=1.974
EFL/T3=2.226
EFL/T4=1.268
AAG/T4=3.444
T3/T4=0.570
AAG/T2=8.004
G34/T3=2.094
EFL/G23=1.030

Third Example

Figure 10:
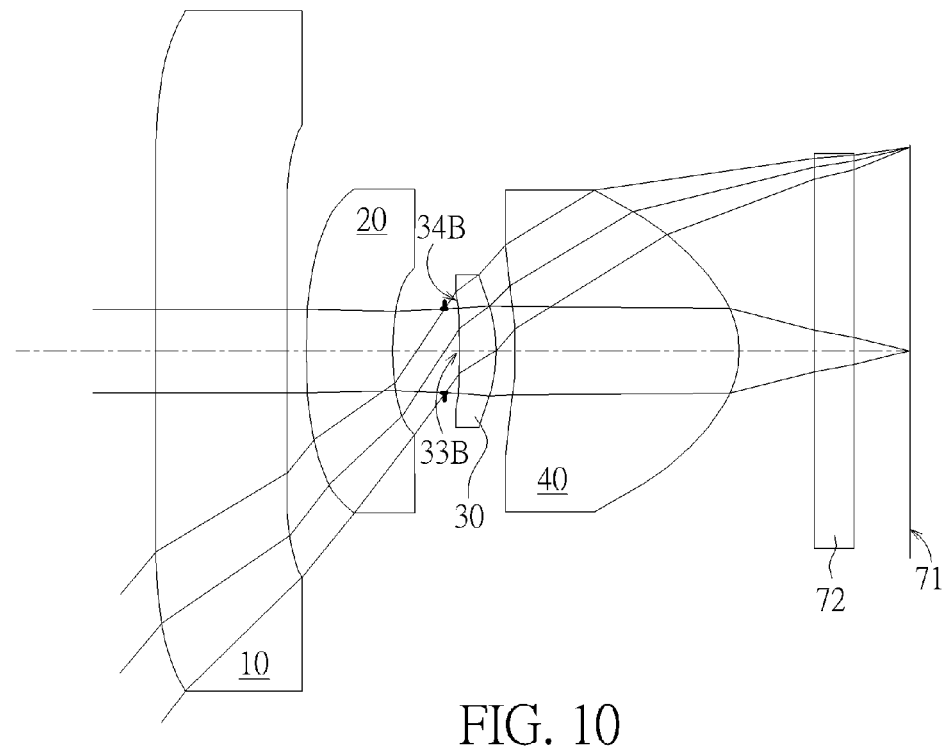
FIG. 10 illustrates a third example of the optical imaging lens set of four lens elements of the present invention.
Figures 11A, 11B, 11C, 11D:
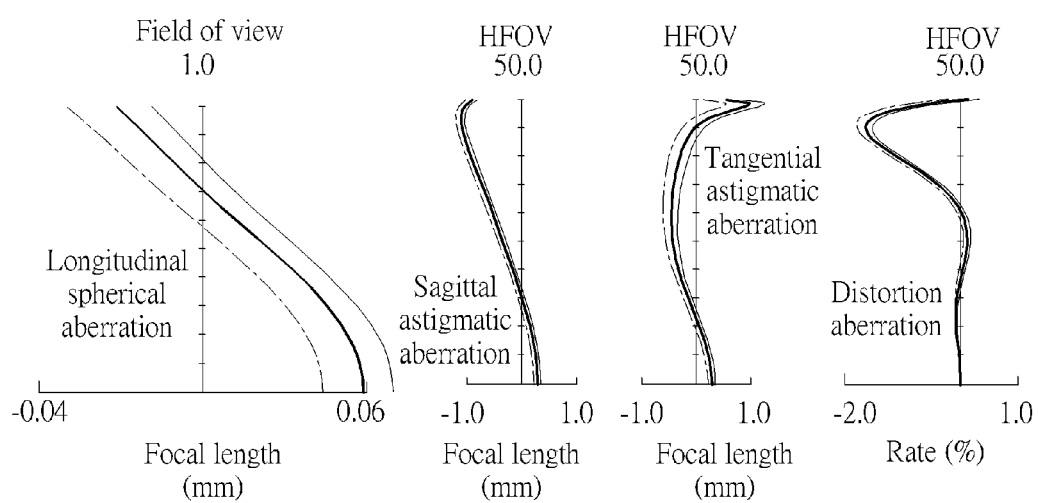
FIG. 11A illustrates the longitudinal spherical aberration on the image plane of the third example.
FIG. 11B illustrates the astigmatic aberration on the sagittal direction of the third example.
FIG. 11C illustrates the astigmatic aberration on the tangential direction of the third example.
FIG. 11D illustrates the distortion aberration of the third example.

Please refer to FIG. 10 which illustrates the third example of the optical imaging lens set 1 of the present invention. Please refer to FIG. 11A for the longitudinal spherical aberration on the image plane 71 of the third example; please refer to FIG. 11B for the astigmatic aberration on the sagittal direction; please refer to FIG. 11C for the astigmatic aberration on the tangential direction, and please refer to FIG. 11D for the distortion aberration. The components in the third example are similar to those in the first example, but the optical data such as the curvature radius, the refractive power, the lens thickness, the lens focal length, the aspheric surface or the back focal length in this example are different from the optical data in the first example, and in this example, the first lens element 10 has positive refractive power, the third object-side surface 31 of the third lens element 30 is a concave surface, having a concave part 33B in the vicinity of the optical axis and a concave part 34B in a vicinity of its circular periphery. The optical data of the third example of the optical imaging lens set are shown in FIG. 26 while the aspheric surface data are shown in FIG. 27. The length of the optical imaging lens set is 3.987 mm. HFOV is 50 degrees. Some important ratios of the third example are as follows:

T1/T2=1.545
ALT/T3=12.990
EFL/T2=1.969
ALT/G34=25.847
T1/T3=3.605
AAG/T3=2.836
T1/T4=0.596
AAG/T1=0.787
G34/T4=0.083
ALT/T4=2.147
ALT/G23=7.155
EFL/T3=4.595
EFL/T4=0.759
AAG/T4=0.469
T3/T4=0.165
AAG/T2=1.215
G34/T3=0.503
EFL/G23=2.531

Fourth Example

Figure 12:
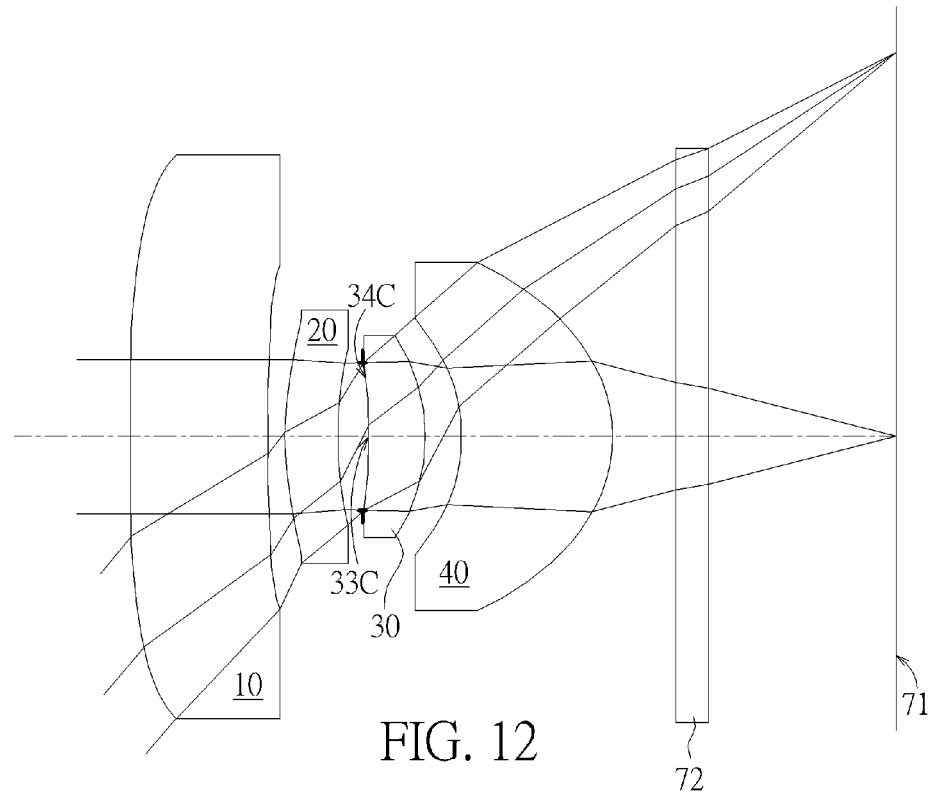
FIG. 12 illustrates a fourth example of the optical imaging lens set of four lens elements of the present invention.
Figures 13A, 13B, 13C, 13D:
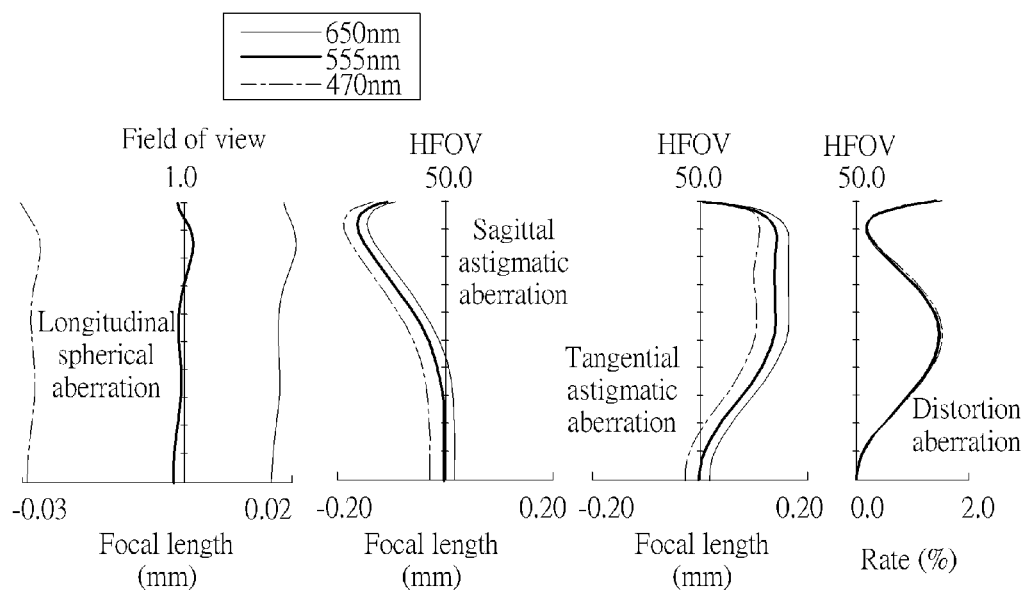
FIG. 13A illustrates the longitudinal spherical aberration on the image plane of the fourth example.
FIG. 13B illustrates the astigmatic aberration on the sagittal direction of the fourth example.
FIG. 13C illustrates the astigmatic aberration on the tangential direction of the fourth example.
FIG. 13D illustrates the distortion aberration of the fourth example.

Please refer to FIG. 12 which illustrates the fourth example of the optical imaging lens set 1 of the present invention. Please refer to FIG. 13A for the longitudinal spherical aberration on the image plane 71 of the fourth example; please refer to FIG. 13B for the astigmatic aberration on the sagittal direction; please refer to FIG. 13C for the astigmatic aberration on the tangential direction, and please refer to FIG. 13D for the distortion aberration. The components in the fourth example are similar to those in the first example, but the optical data such as the curvature radius, the refractive power, the lens thickness, the lens focal length, the aspheric surface or the back focal length in this example are different from the optical data in the first example, and in this example, the first lens element 10 has positive refractive power, the second lens element 20 has positive refractive power, the third object-side surface 31 of the third lens element 30 is a concave surface, having a concave part 33C in the vicinity of the optical axis and a concave part 34C in a vicinity of its circular periphery. The optical data of the fourth example of the optical imaging lens set are shown in FIG. 28 while the aspheric surface data are shown in FIG. 29. The length of the optical imaging lens set is 4.870 mm. HFOV is 50 degrees. Some important ratios of the fourth example are as follows:

T1/T2=2.604
ALT/T3=6.951
EFL/T2=5.979
ALT/G34=11.158
T1/T3=2.404
AAG/T3=1.423
T1/T4=0.917
AAG/T1=0.592
G34/T4=0.238
ALT/T4=2.650
ALT/G23=13.250
EFL/T3=5.522
EFL/T4=2.105
AAG/T4=0.543
T3/T4=0.381
AAG/T2=1.541
G34/T3=0.623
EFL/G23=10.526

Fifth Example

Figure 14:
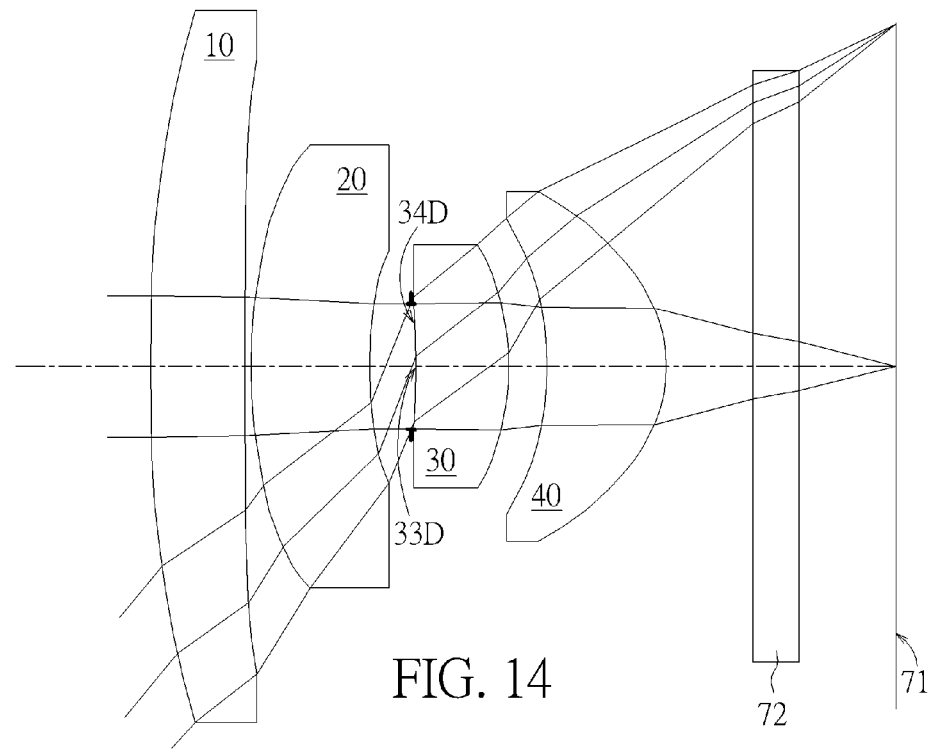
FIG. 14 illustrates a fifth example of the optical imaging lens set of four lens elements of the present invention.
Figure 15A:
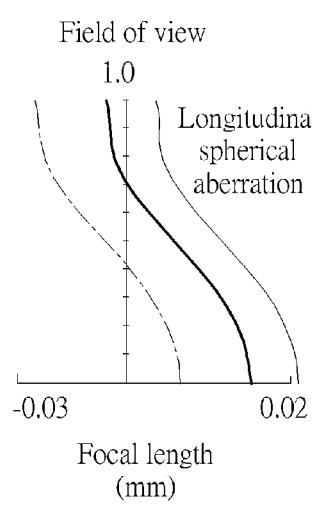
FIG. 15A illustrates the longitudinal spherical aberration on the image plane of the fifth example.
Figures 15B, 15C:
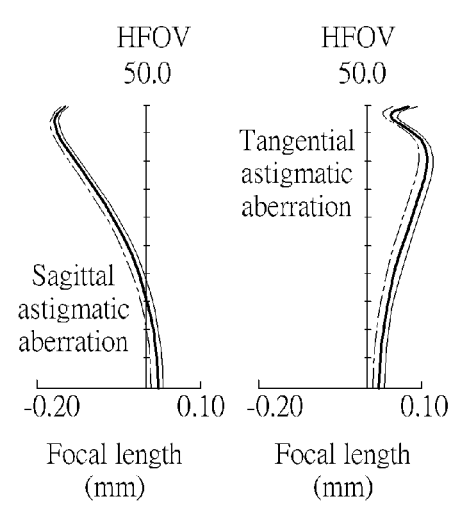
FIG. 15B illustrates the astigmatic aberration on the sagittal direction of the fifth example.
FIG. 15C illustrates the astigmatic aberration on the tangential direction of the fifth example.
Figure 15D:
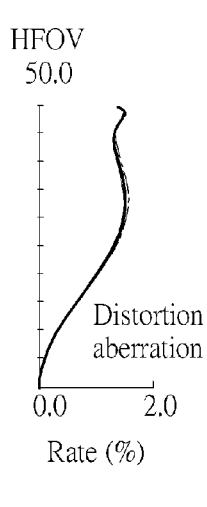
FIG. 15D illustrates the distortion aberration of the fifth example.

Please refer to FIG. 14 which illustrates the fifth example of the optical imaging lens set 1 of the present invention. Please refer to FIG. 15A for the longitudinal spherical aberration on the image plane 71 of the fifth example; please refer to FIG. 15B for the astigmatic aberration on the sagittal direction; please refer to FIG. 15C for the astigmatic aberration on the tangential direction, and please refer to FIG. 15D for the distortion aberration. The components in the fifth example are similar to those in the first example, but the optical data such as the curvature radius, the refractive power, the lens thickness, the lens focal length, the aspheric surface or the back focal length in this example are different from the optical data in the first example, and in this example, the first lens element 10 has positive refractive power, the third object-side surface 31 of the third lens element 30 is a concave surface, having a concave part 33D in the vicinity of the optical axis and a concave part 34D in a vicinity of its circular periphery. The optical data of the fifth example of the optical imaging lens set are shown in FIG. 30 while the aspheric surface data are shown in FIG. 31. The length of the optical imaging lens set is 3.427 mm. HFOV is 50 degrees. Some important ratios of the fifth example are as follows:

T1/T2=0.795
ALT/T3=4.521
EFL/T2=2.407
ALT/G34=11.211
T1/T3=1.000
AAG/T3=0.949
T1/T4=0.792
AAG/T1=0.949
G34/T4=0.319
ALT/T4=3.580
ALT/G23=9.478
EFL/T3=3.028
EFL/T4=2.398
AAG/T4=0.752
T3/T4=0.792
AAG/T2=0.755
G34/T3=0.403
EFL/G23=6.348

Sixth Example

Please refer to FIG. 16 which illustrates the sixth example of the optical imaging lens set 1 of the present invention. Please refer to FIG. 17A for the longitudinal spherical aberration on the image plane 71 of the sixth example; please refer to FIG. 17B for the astigmatic aberration on the sagittal direction; please refer to FIG. 17C for the astigmatic aberration on the tangential direction, and please refer to FIG. 17D for the distortion aberration. The components in the sixth example are similar to those in the first example, but the optical data such as the curvature radius, the refractive power, the lens thickness, the lens focal length, the aspheric surface or the back focal length in this example are different from the optical data in the first example. The optical data of the sixth example of the optical imaging lens set are shown in FIG. 32 while the aspheric surface data are shown in FIG. 33. The length of the optical imaging lens set is 3.200 mm. HFOV is 50 degrees. Some important ratios of the sixth example are as follows:

T1/T2=1.000
ALT/T3=2.853
EFL/T2=2.904
ALT/G34=28.066
T1/T3=0.678
AAG/T3=0.805
T1/T4=1.366
AAG/T1=1.187
G34/T4=0.205
ALT/T4=5.745
ALT/G23=5.110
EFL/T3=1.970
EFL/T4=3.966
AAG/T4=1.621
T3/T4=2.013
AAG/T2=1.187
G34/T3=0.102
EFL/G23=3.528

Seventh Example

Please refer to FIG. 18 which illustrates the seventh example of the optical imaging lens set 1 of the present invention. Please refer to FIG. 19A for the longitudinal spherical aberration on the image plane 71 of the seventh example; please refer to FIG. 19B for the astigmatic aberration on the sagittal direction; please refer to FIG. 19C for the astigmatic aberration on the tangential direction, and please refer to FIG. 19D for the distortion aberration. The components in the seventh example are similar to those in the first example, but the optical data such as the curvature radius, the refractive power, the lens thickness, the lens focal length, the aspheric surface or the back focal length in this example are different from the optical data in the first example, and in this example, the second lens element 20 has positive refractive power. The optical data of the seventh example of the optical imaging lens set are shown in FIG. 34 while the aspheric surface data are shown in FIG. 35. The length of the optical imaging lens set is 3.809 mm. HFOV is 50 degrees. Some important ratios of the seventh example are as follows:

T1/T2=1.039
ALT/T3=2.860
EFL/T2=4.639
ALT/G34=18.882
T1/T3=0.699
AAG/T3=0.725
T1/T4=1.430
AAG/T1=1.037
G34/T4=0.310
ALT/T4=5.853
ALT/G23=6.702
EFL/T3=3.121
EFL/T4=6.387
AAG/T4=1.483
T3/T4=2.047
AAG/T2=1.077
G34/T3=0.151
EFL/G23=7.313

Some important ratios in each example are shown in FIG. 36.

In the light of the above examples, the inventors observe the following features:

1. The aperture stop is disposed between the second lens element and the third lens element, so as to improve the imaging quality.

2. The first object-side surface of the first lens element has a convex part in a vicinity of its circular periphery; the second image-side surface of the second lens element has a concave part in a vicinity of the optical axis; the third image-side surface of the third lens element has a convex part in a vicinity of the optical axis; the fourth object-side surface of the fourth lens element has a concave part in a vicinity of the optical axis, where each of the surfaces match each other, in order to improve the aberration.

3. The fourth lens element is made of plastic, helping to decrease the manufacturing cost and lightened the weight.

4. If further matching the first object-side surface of the first lens element having a convex part in a vicinity of the optical axis, the first image-side surface of the first lens element has a concave part in a vicinity of the optical axis, and a concave part in a vicinity of its circular periphery; the second image-side surface of the second lens element has a concave part in a vicinity of its circular periphery; the third image-side surface of the third lens element has a convex part in a vicinity of its circular periphery; the fourth object-side surface of the fourth lens element has a concave part in a vicinity of its circular periphery; the fourth image-side surface of the fourth lens element has a convex part in a vicinity of the optical axis and a convex part in a vicinity of its circular periphery, where each of the surfaces match each other, ensuring good performance while decreasing the total length of the optical imaging lens set. Furthermore, if all of the lens elements are made of plastic, this can further help to decrease the manufacturing cost and lighten the weight, helping to form the aspherical surface.

In addition, the inventors discover that there are some better ratio ranges for different data according to the above various important ratios. Better ratio ranges help the designers to design the better optical performance and an effectively reduced length of a practically possible optical imaging lens set. For example:

(1) Since the lens element becomes lighter and thinner, and the quality demands get higher and higher, so that the lens is designed to have different shape surface in a vicinity of the optical axis and in vicinity of its circular periphery, the thickness is different in the central part of the lens element or near the edge of the lens element. Considering the characteristics of light, the light which is emitted from the near-edge side of the lens element has the longer path and larger refraction angle to focus onto the image plane. The present invention has larger HFOV, and the first lens element should be larger for helping to collect the light, so the first lens element has larger optical effective apertures. Besides, if T1 can be decreased, it will further decrease the total length of the optical imaging lens set. Preferably, the present invention satisfies the following relationships: T1/T2≤6.1, T1/T3≤10, T1/T4≤20, further satisfies T1/T3≤6 and T1/T4≤5.

(2) In the present invention, except for the first object-side surface of the first lens element, the shapes of other surfaces in vicinity of its circular periphery are not limited, so the edge interference phenomenon caused by small air gaps between every two adjacent lens elements can be avoided. In addition, the second image-side surface of the second lens element in vicinity of the optical axis is limited to being a concave part, but the shape of the third object-side surface of the third lens element in vicinity of the optical axis is not limited, so G23 can be relatively small. Besides, since the third image-side surface of the third lens element in vicinity of the optical axis is a convex part, and the fourth object-side surface of the fourth lens element in vicinity of the optical axis is a concave part, G34 can be decreased too. In summary, G12, G23 and G34 can be shrunk more, so AAG can also be shrunk too. But considering the difficulties during the manufacturing process, the thickness of each lens element cannot be shrunk unlimitedly. When the following relationships are satisfied, the optical imaging lens set has easier manufacturing process and higher yield: $1.7 \leq$ ALT/G34, AAG/T3$\leq$12, AAG/T1$\leq$15, G34/T4$\leq$22, 1$\leq$ALT/G23, AAG/T4$\leq$15, AAG/T2$\leq$8.1, G34/T3$\leq$10, 1$\leq$EFL/G23.

Furthermore, the relationships mentioned above preferably satisfy: AAG/T3$\leq$9, AAG/T1$\leq$10, G34/T4$\leq$5, AAG/T4$\leq$6, G34/T3$\leq$5.

(3) The present invention has larger HFOV, and since decreasing EFL can further enlarge the HFOV, the present invention has smaller EFL. Preferably, the present invention satisfies the following relationships: EFL/T2$\leq$45, EFL/T3$\leq$70, EFL/T4$\leq$150. Furthermore, parts of the relationships mentioned above also satisfied: EFL/T2$\leq$15, EFL/T3$\leq$10, EFL/T4$\leq$10.

(4) The total thickness of all the lens elements in the optical imaging lens set along the optical axis is ALT. Therefore, ALT greatly influences the total length of the optical imaging lens set, and decreasing ALT can help to shrink the total length of the optical imaging lens set effectively. Besides, if the relationships of ALT/T3$\leq$13, ALT/T4$\leq$27, and T3/T4$\leq$1.7 are satisfied, the optical imaging lens set has better arrangement.

Furthermore, the present invention further satisfies the relationship of ALT/T4$\leq$8.

Figure 20:
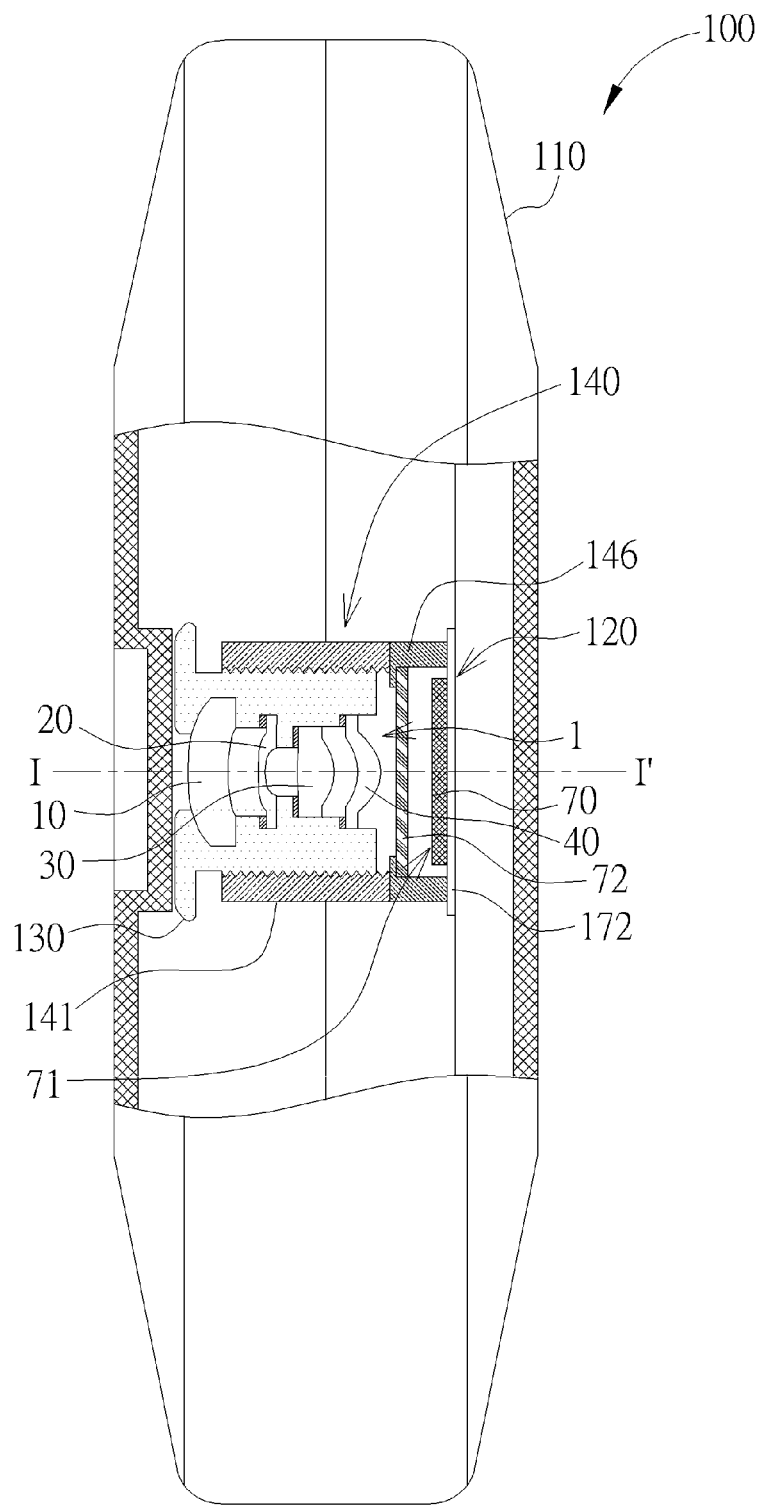
FIG. 20 illustrates a first preferred example of the portable electronic device with an optical imaging lens set of the present invention.

The optical imaging lens set 1 of the present invention may be applied to an electronic device, such as game consoles or driving recorders. Please refer to FIG. 20. FIG. 20 illustrates a first preferred example of the optical imaging lens set 1 of the present invention for use in a portable electronic device 100. The electronic device 100 includes a case 110, and an image module 120 mounted in the case 110. A driving recorder is illustrated in FIG. 20 as an example, but the electronic device 100 is not limited to a driving recorder.

As shown in FIG. 20, the image module 120 includes the optical imaging lens set 1 as described above. FIG. 20 illustrates the aforementioned first example of the optical imaging lens set 1. In addition, the portable electronic device 100 also contains a barrel 130 for the installation of the optical imaging lens set 1, a module housing unit 140 for the installation of the barrel 130, a substrate 172 for the installation of the module housing unit 140 and an image sensor 70 disposed at the substrate 172, and at the image side 3 of the optical imaging lens set 1. The image sensor 70 in the optical imaging lens set 1 may be an electronic photosensitive element, such as a charge coupled device or a complementary metal oxide semiconductor element. The image plane 71 forms at the image sensor 70.

The image sensor 70 used here is a product of chip on board (COB) package rather than a product of the conventional chip scale package (CSP) so it is directly attached to the substrate 172, and protective glass is not needed in front of the image sensor 70 in the optical imaging lens set 1, but the present invention is not limited to this.

To be noticed in particular, the optional filter 72 may be omitted in other examples although the optional filter 72 is present in this example. The case 110, the barrel 130, and/or the module housing unit 140 may be a single element or consist of a plurality of elements, but the present invention is not limited to this.

Each one of the four lens elements 10, 20, 30 and 40 with refractive power is installed in the barrel 130 with air gaps disposed between two adjacent lens elements in an exemplary way. The module housing unit 140 has a lens element housing 141, and an image sensor housing 146 installed between the lens element housing 141 and the image sensor 70. However in other examples, the image sensor housing 146 is optional. The barrel 130 is installed coaxially along with the lens element housing 141 along the axis I-I', and the barrel 130 is provided inside of the lens element housing 141.

Figure 21:
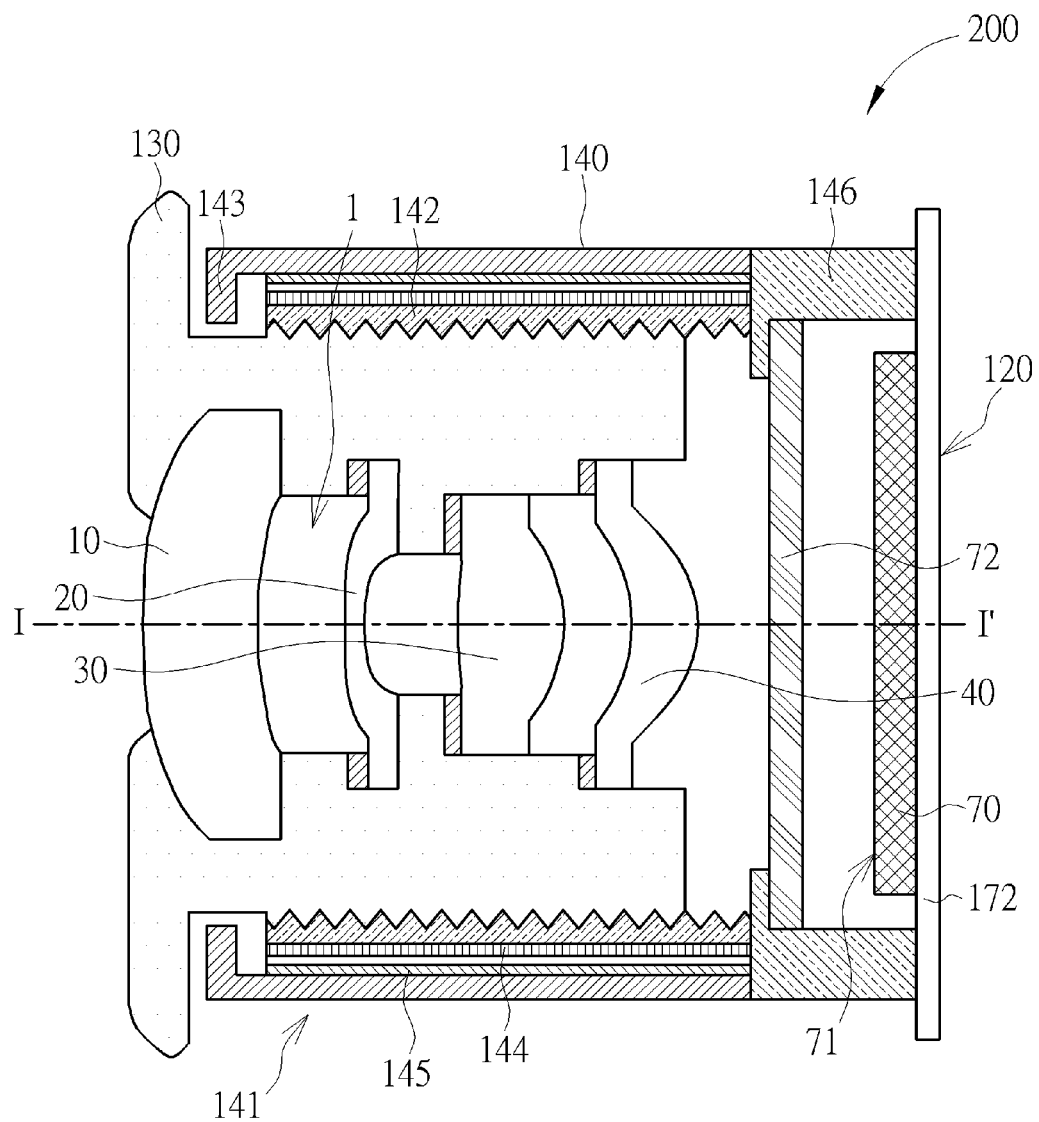
FIG. 21 illustrates a second preferred example of the portable electronic device with an optical imaging lens set of the present invention.

Please also refer to FIG. 21 for another application of the aforementioned optical imaging lens set 1 in a portable electronic device 200 in the second preferred example. The main differences between the portable electronic device 200 in the second preferred example and the portable electronic device 100 in the first preferred example are: the lens element housing 141 has a first seat element 142, a second seat element 143, a coil 144 and a magnetic component 145. The first seat element 142 is for the installation of the barrel 130, exteriorly attached to the barrel 130 and disposed along the axis I-I'. The second seat element 143 is disposed along the axis I-I' and surrounds the exterior of the first seat element 142. The coil 144 is provided between the outside of the first seat element 142 and the inside of the second seat element 143. The magnetic component 145 is disposed between the outside of the coil 144 and the inside of the second seat element 143.

The first seat element 142 may pull the barrel 130 and the optical imaging lens set 1 which is disposed inside of the barrel 130 to move along the axis I-I', namely the optical axis 4 in FIG. 6. The image sensor housing 146 is attached to the second seat element 143. The filter 72, such as an infrared filter, is installed at the image sensor housing 146. Other details of the portable electronic device 200 in the second preferred example are similar to those of the portable electronic device 100 in the first preferred example so they are not elaborated again.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An optical imaging lens set, from an object side toward an image side in order along an optical axis comprising: a first lens element, a second lens element, an aperture stop, a third lens element and a fourth lens element, said first to fourth lens elements having an object-side surface facing toward the object side as well as an image-side surface facing toward the image side, wherein:

said first lens element has an object-side surface with a convex part in a vicinity of the its periphery;

said second lens element has an image-side surface with a concave part in a vicinity of the optical axis, and said second lens element has negative refractive power;

said aperture stop is disposed between said second lens element and said third lens element;

said third lens element has positive refractive power, and has an image-side surface with a convex part in a vicinity of the optical axis;

said fourth lens element is made of plastic material and has positive refractive power, and has an object-side surface with a concave part in a vicinity of the optical axis; and the optical imaging lens set does not include any lens element with refractive power other than said first, second, third and fourth lens elements.

2. The optical imaging lens set of claim 1, wherein a thickness T1 of said first lens element along said optical axis, and a thickness T2 of said second lens element along said optical axis satisfy a relationship $T1/T2 \leq 6.1$.

3. The optical imaging lens set of claim 2, wherein a total thickness ALT of said first lens element, said second lens element, said third lens element and said fourth lens element along said optical axis, and a thickness T3 of said third lens element along said optical axis satisfy a relationship $ALT/T3 \leq 13$.

4. The optical imaging lens set of claim 2, wherein the effective focal length EFL of the optical imaging lens set satisfies a relationship $EFL/T2 \leq 45$.

5. The optical imaging lens set of claim 1, wherein a total thickness ALT of said first lens element, said second lens element, said third lens element and said fourth lens element along said optical axis, and an air gap G34 between said third lens element and said fourth lens element along said optical axis satisfy a relationship $1.7 \leq ALT/G34$.

6. The optical imaging lens set of claim 5, wherein a thickness T1 of said first lens element along said optical axis, and a thickness T3 of said third lens element along said optical axis satisfy a relationship $T1/T3 \leq 10$.

7. The optical imaging lens set of claim 1, wherein the sum of all three air gaps AAG between each lens element from said first lens element to said fourth lens element along the optical axis, and a thickness T3 of said third lens element along said optical axis satisfy a relationship $AAG/T3 \leq 12$.

8. The optical imaging lens set of claim 7, wherein a thickness T1 of said first lens element along said optical axis, and a thickness T4 of said fourth lens element along said optical axis satisfy a relationship $T1/T4 \leq 20$.

9. The optical imaging lens set of claim 1, wherein the sum of all three air gaps AAG between each lens element from said first lens element to said fourth lens element along the optical axis, and a thickness T1 of said first lens element along said optical axis satisfy a relationship $AAG/T1 \leq 15$.

10. The optical imaging lens set of claim 9, wherein an air gap G34 between said third lens element and said fourth lens element along said optical axis, and a thickness T4 of said fourth lens element along said optical axis satisfy a relationship $G34/T4 \leq 22$.

11. The optical imaging lens set of claim 9, wherein a total thickness ALT of said first lens element, said second lens element, said third lens element and said fourth lens element along said optical axis, and a thickness T4 of said fourth lens element along said optical axis satisfy a relationship $ALT/T4 \leq 27$.

12. The optical imaging lens set of claim 1, wherein a total thickness ALT of said first lens element, said second lens element, said third lens element and said fourth lens element along said optical axis, and an air gap G23 between said second lens element and said third lens element along said optical axis satisfy a relationship $1 \leq ALT/G23$.

13. The optical imaging lens set of claim 12, wherein the effective focal length EFL of the optical imaging lens set, and a thickness T3 of said third lens element along said optical axis satisfy a relationship $EFL/T3 \leq 70$.

14. The optical imaging lens set of claim 12, wherein the effective focal length EFL of the optical imaging lens set, and a thickness T4 of said fourth lens element along said optical axis satisfy a relationship $EFL/T4 \leq 150$.

15. The optical imaging lens set of claim 1, wherein the sum of all three air gaps AAG between each lens element from said first lens element to said fourth lens element along the optical axis, and a thickness T4 of said fourth lens element along said optical axis satisfy a relationship $AAG/T4 \leq 15$.

16. The optical imaging lens set of claim 1, wherein a thickness T3 of said third lens element along said optical axis, and a thickness T4 of said fourth lens element along said optical axis satisfy a relationship $T3/T4 \leq 1.7$.

17. The optical imaging lens set of claim 1, wherein the sum of all three air gaps AAG between each lens element from said first lens element to said fourth lens element along the optical axis, and a thickness T2 of said second lens element along said optical axis satisfy a relationship $AAG/T2 \leq 8.1$.

18. The optical imaging lens set of claim 1, wherein an air gap G34 between said third lens element and said fourth lens element along said optical axis, and a thickness T3 of said third lens element along said optical axis satisfy a relationship $G34/T3 \leq 10$.

19. The optical imaging lens set of claim 18, wherein the effective focal length EFL of the optical imaging lens set, and an air gap G23 between said second lens element and said third lens element along said optical axis satisfy a relationship $1 \leq EFL/G23$.

20. An electronic device, comprising:
a case; and
an image module disposed in said case and comprising:
an optical imaging lens set of claim 1;
a barrel for the installation of said optical imaging lens set;
a module housing unit for the installation of said barrel;
a substrate for the installation of said module housing unit; and
an image sensor disposed on the substrate and disposed at an image side of said optical imaging lens set.

* * * * *